United States Patent
Lipovkov

(10) Patent No.: US 10,270,763 B2
(45) Date of Patent: Apr. 23, 2019

(54) VIRTUAL SIM AUTHENTICATION

(71) Applicant: David Lipovkov, Ganei Tikva (IL)

(72) Inventor: David Lipovkov, Ganei Tikva (IL)

( * ) Notice: Subject to any disclaimer, the term of this patent is extended or adjusted under 35 U.S.C. 154(b) by 0 days.

(21) Appl. No.: 15/700,132

(22) Filed: Sep. 10, 2017

(65) Prior Publication Data
US 2018/0077152 A1    Mar. 15, 2018

Related U.S. Application Data

(60) Provisional application No. 62/397,951, filed on Sep. 22, 2016, provisional application No. 62/394,255, filed on Sep. 14, 2016.

(51) Int. Cl.
| | |
|---|---|
| *H04M 1/66* | (2006.01) |
| *H04L 29/06* | (2006.01) |
| *H04W 4/60* | (2018.01) |
| *H04W 12/06* | (2009.01) |
| *H04B 7/26* | (2006.01) |
| *H04W 8/18* | (2009.01) |
| *H04W 88/02* | (2009.01) |

(52) U.S. Cl.
CPC .......... *H04L 63/0853* (2013.01); *H04W 4/60* (2018.02); *H04W 12/06* (2013.01); *H04B 7/2628* (2013.01); *H04W 8/183* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2015/0304506 A1* | 10/2015 | Zhu | ......... | H04M 15/49 455/406 |
| 2016/0330784 A1* | 11/2016 | Liu | ......... | H04W 12/06 |
| 2018/0109942 A1* | 4/2018 | Lipovkov | ......... | H04W 8/183 |

* cited by examiner

*Primary Examiner* — Erika A Washington
(74) *Attorney, Agent, or Firm* — Edward Langer

(57) ABSTRACT

According to a first aspect of the present disclosed subject matter, a mobile terminal comprises a single cellular modem having concurrent protocol stack that is capable of simultaneous communicating over two channels with at least one mobile network, a logic selector configured to pass authentication information of a SIM to the modem, wherein the SIM can be a physical SIM accommodated in a first slot (native SIM) or a virtual SIM. The terminal further comprises firmware retained in a non-transitory memory operative to cause the mobile terminal to obtain and authenticate the virtual SIM for communicating with the at least one mobile networks, wherein the virtual SIM is obtained from a SIM server connected to a SIM bank that comprises a plurality of SIM profiles.

17 Claims, 13 Drawing Sheets

VIRTUAL SIM AUTHENTICATION

TECHNICAL FIELD

The present disclosed subject matter relates to mobile cellular communications. More particularly, the present disclosed subject matter relates to identification and authentication of subscribers on mobile telephony.

BACKGROUND

Mobile terminals are equipment and or devices; such as handheld cellular phones, tablets, mobile hotspots or any IoT elements; utilizing mobile (wireless) technologies, for example, universal mobile telecommunications system (UMTS), code division multiple access (CDMA) global system for mobile communication, (GSM); Long Term Evolution (LTE); a combination thereof, or the like; for communicating voice and data.

The technologies vary from one carrier network to another, the carrier, i.e. mobile service providers (MSP) require the use of personalizing subscriber identity module (SIM) plug-in card in each mobile terminal. The SIM inserted into mobile terminals contains security algorithms required for authentication, personal information, service level and personal data of the mobile terminal user. The SIM functionality can be retained and implemented on a universal integrated circuit card (UICC) or a substantial part thereof. The UICC is a physical smart card, equipped with processing capabilities as well as memory that retain data and several applications utilized for accessing MSP networks, and the like. Typically mobile terminals are based on removable UICC, comprising the SIM functionality, which may be replaceable. Emerging technologies introduce embedded UICC (eUICC) or embedded SIM (eSIM), which can be an integral part of the mobile terminals.

Mobile terminal; such as mobile phone, smartphone, mobile hotspot, tablet, smart watch, alarm systems, a combination thereof, or the like; employs the (SIM) to identify and authenticate a subscriber in a MSP network. As a standard SIM comprises a unique value (K) used for authenticating a mobile terminal (MT) subscriber in any given MSP network. The value K is also stored in a repository called authentication center (AuC) of the MSP that provided the SIM to the subscriber. Most MT around the world adhere to following authentication:

a. Following boot up, the MT obtains the SIM's international mobile subscriber identity (IMSI) and passes it to MSP, thus requesting access and authentication.
b. The MSP fetches the IMSI from its AuC, extract its associated K, generate an SRES_1 response (Certificate challenge) based on the K and transmits it back to the MT.
c. The SIM card of the MT obtains the SRES_1 and signs it with its own K, thus generates response SRES_2, which is passes back to the MSP.
d. The MSP compares its SRES_1 with the SRES_2, returned from the MT, if they match the SIM is authenticated and the MT subscriber is granted access to the MSP network.

The services provided by the MSPs are often limited, expensive and difficult to change once the subscriber locks into a particular MSP service. MSPs models for voice and data service employ direct charges to the caller, either via an invoice, calling card, credit card or associated charge number. International travelers are charged with high roaming charges for incoming and outgoing calls as well as data usage, on top of the tolls. Practically, international travelers are faced with the options of either buy a local SIM card or use a roaming plan. This is very inconvenient and also costly, especially when traveling to many countries.

In the last 3 decades, mobile wireless technologies have experience about five generations of technology evolution. Current focus in mobile wireless technology concentrates on advance implementation of 4G technology and 5G technology. First generation (1G) was based on analog cellular networks which contributed, to the mobile technology, the use of multiple cell sites, and the ability to transfer calls from one site to another as a subscriber traveled between cells during a conversation. The 1G was the last mobile analog network; the following generations were all digital generations.

Second generation (2G) was the first digital transmission networks, which primarily used GSM standard. The second generation introduced text messaging (SMS) initially on GSM networks and eventually on all digital networks. General packet radio service (GPRS) is a cellular wireless technology developed in between, 2G, and its successor, 3G. GPRS could provide data rates from 56 kbps up to 115 kbps. The enhanced data rates for GSM evolution (EDGE) is an extended version of GSM, which extended the data transmission to 384 kbps.

Third generation (3G) is a: High speed internet protocol (IP) data networks. The main technological differentiating 3G from 2G is the use of packet switching instead of circuit switching for data transmission. IP packet switching enabled the, later on, development of the universal mobile telecommunications system (UMTS) boosting the data transfer rates and capacity. Current HSDPA deployments support downlink speeds of 1.8 Mbps to 84 Mbps.

Forth generation (4G) was mainly focused on Growth of mobile broadband. 4G is basically an extension of the 3G technology with more bandwidth and services, coupled with replacement of circuit switching with an all IP network for audio/video streaming as well as Voice over IP (VoIP). The 4G LTE data transfer rate can reach 100 Mbps downstream and 100 Mbps upstream. Fifth generation 5G, is the proposed next mobile communication beyond the 4G, the 5G may aims at higher broadband capacity per user per cell as well as higher consumption rate per month per user.

BRIEF SUMMARY

According to a first aspect of the present disclosed subject matter, a mobile terminal comprising: a single cellular modem, having concurrent protocol stack, capable of simultaneous communicating over two channels with at least one mobile network. a logic selector configured to pass authentication information of a SIM to the modem, wherein the SIM is selected from a group comprising of a physical SIM accommodated in a first slot (native SIM); a virtual SIM; and a combination thereof; firmware retained in a non-transitory memory operative to cause the mobile terminal to obtain and authenticate a virtual SIM for communicating with the at least one mobile networks; and wherein the virtual SIM is obtained from a SIM server connected to a SIM bank that comprises a plurality of SIM profiles.

In some exemplary embodiments, the logic selector is provided by implementation selected from a group comprising of firmware; hardware; and a combination thereof.

In some exemplary embodiments, the native SIM comprising SIM card profile.

In some exemplary embodiments, the mobile terminal further comprises a processor, and wherein the logic selector, the modem, the processor, and the memory are part of a system on chip.

In some exemplary embodiments, the mobile terminal further comprises a second slot, wherein the second slot is adapted to accommodate a keepgo integrated circuit card (KICC), and wherein the KICC is configured to facilitate the obtain and authenticate a virtual-SIM.

In some exemplary embodiments, the mobile terminal communicates over at least two channels with a single modem and a single SIM, wherein the single SIM is a native SIM inserted in the first slot.

In some exemplary embodiments, the native SIM is a KICC.

According to another aspect of the present disclosed subject matter, a method for acquiring and authenticating a virtual-SIM for a mobile terminal, having a single modem capable of concurrently communicate over a first channel and a second channel and a single native SIM, the method comprising: authenticating the native SIM of the mobile terminal by enabling communication over the first channel between the native SIM via a logic selector of the mobile terminal with a mobile service provider (MSP); determining a roaming MSP (RMSP) requesting and obtaining over the first channel an IMSI of a virtual-SIM for the mobile terminal from a SIM-server configured to obtain virtual SIM information from a SIMS Bank; initializing authentication of the virtual-SIM with the RMSP by passing an IMSI of the virtual-SIM via the logic selector over the second channel to the RMSP; generating and issuing over the second channel a first certificate challenge (SRES_1) by the RMSP to the mobile terminal; redirecting the SRES_1 from the mobile terminal over the first channel to the SIM-server; generating a response (SRES_2) by the SIM-server and issuing the SRES_2 to the mobile terminal over the first channel; redirecting the SRES_2 via the logic selector of the mobile terminal to the RMSP over the second channel; and authenticating the virtual-SIM by verifying that the SRES_2 comply with the SRES_1 and enabling mobile terminal communication over the second channel through the RMSP.

In some exemplary embodiments, the mobile terminal further comprises a firmware configured to control communication activities of the mobile terminal, and wherein operations associated to the logic selector is done by a firmware.

In some exemplary embodiments, the authenticating the native SIM further comprises: passing an IMSI of the native-SIM of the mobile terminal to the MSP; issuing an SRES_1 by MSP to the mobile terminal; replying to the MSP with an SRES_2 of the mobile terminal; and verifying that the SRES_2 comply with the SRES_1 and enabling mobile terminal communication over the first channel through the MSP.

In some exemplary embodiments, the determining RMSP comprises: identifying country and an area codes in which the mobile terminal operate by processing's selected from a group comprising of: IP address query; GPS analysis, MSP availability; and a combination thereof; and selecting the RMSP according to criteria's selected from a group comprising of: network code; area code; signal strength; network availability; cost; and a combination thereof.

In some exemplary embodiments, the SIM-server is accessed through the Internet via the first channel.

In some exemplary embodiments, the authenticating the native SIM of the mobile terminal is authenticating a KICC, and wherein the KICC is configured to emulate the native SIM.

In some exemplary embodiments, the KICC is further configured to facilitate virtual-SIM authentication of the mobile terminal.

In some exemplary embodiments, the KICC is further configured to perform operations associated with the logic selector.

In some exemplary embodiments, the KICC is further configured to retain the IMSI of the virtual-SIM.

In some exemplary embodiments, the KICC is capable of emulating the virtual-SIM

In some exemplary embodiments, the KICC is configured for alternating between the native SIM the virtual-SIM when communicating over the first channel and the second respectively.

According to a yet another aspect of the present disclosed subject matter, A system for virtual SIM dynamic allocation comprising: the mobile terminal of Claim 1a SIM-server configured to allocate virtual SIM for the mobile terminal; and a SIM Bank comprising a plurality of SIMs selected from a group comprising of physical SIM cards; SIMs profiles; and a combination thereof.

In some exemplary embodiments, the system is configured to communicate with the mobile terminal over at least one mobile network for providing the mobile terminal with the virtual SIM, wherein the system further comprises computation capabilities, and wherein the computation capabilities are provided to the mobile terminal to facilitate authenticating the virtual SIM allocated to the mobile terminal with an RMSP.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
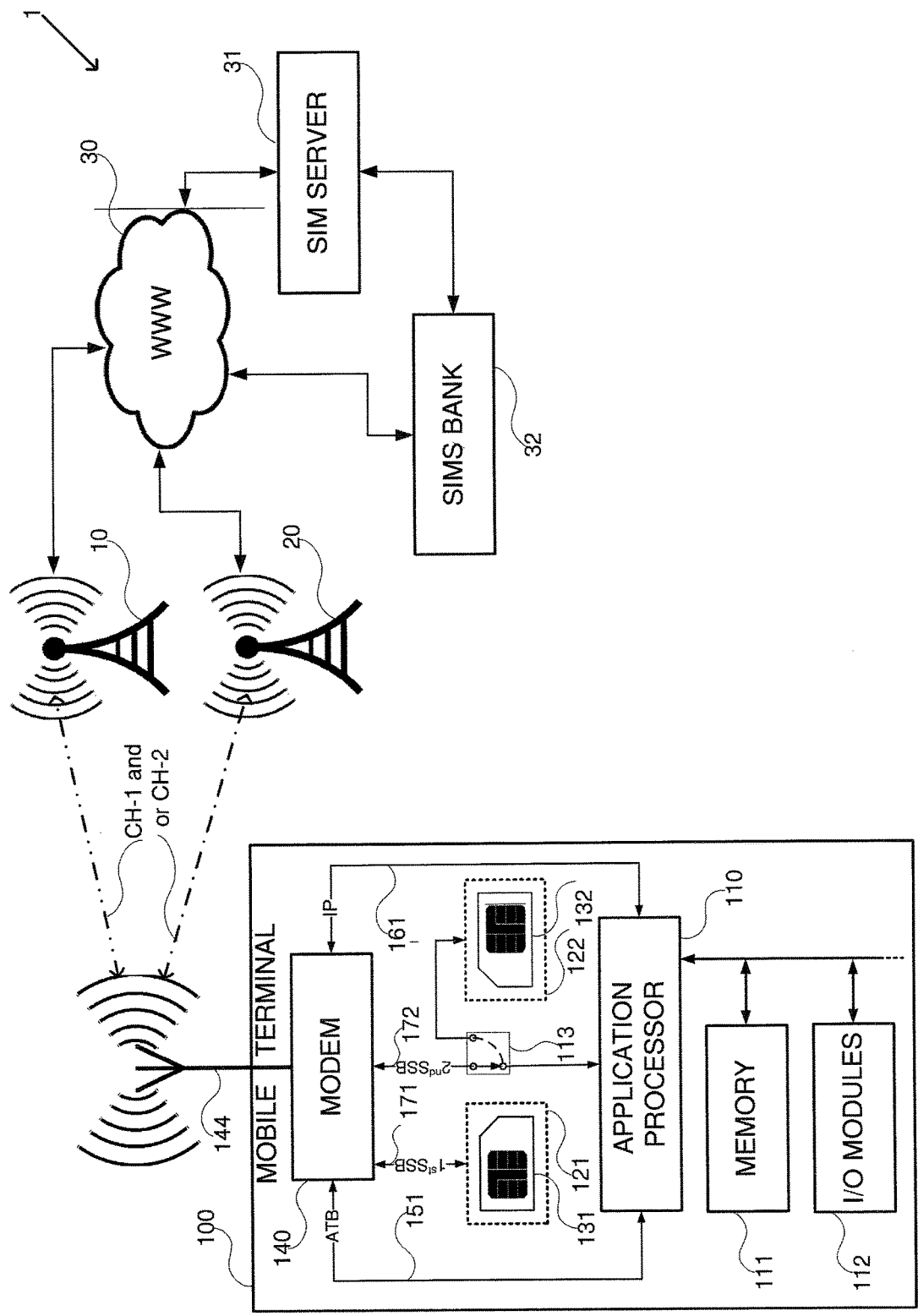
FIG. 1 shows a block diagram of a mobile terminal (MT), in a mobile network, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

One technology advancement affect, resulting from utilizing the present disclosure is: eliminating the need for employing two cellular modems in one mobile terminal for the sake of implementing virtual SIM technology.

Another technology advancement affect, resulting from utilizing the present disclosure is: implementing virtual SIM technology on mobile terminals; such as smartphone, mobile hotspot, tablet, smart watch, IoT devices or the like; that utilize only one commercially available cellular modem.

Yet another technology advancement affect, resulting from utilizing the present disclosure is: implementing virtual SIM technology on mobile terminals comprising single SIM, dual SIM, triple SIM, or more. Additionally or alternatively, the present disclosure can be agnostic to the mobile terminal's operating system and type of SIM.

Yet another technology advancement affect, resulting from utilizing the present disclosure is: using single modem having concurrent protocol stack capability such as, industry standard modems supporting, dual SIM dual active (DSDA) and dual SIM dual standby (DSDS). By utilizing the present disclosure with cellular modems, comprising such concurrent stack capability which may be coupled with Keepgo integrated circuit card (KICC) enables implementing virtual SIM technology on single SIM mobile terminal.

Yet another technology advancement affect, resulting from utilizing the present disclosure is: using single modem having concurrent protocol stack capability. These modems are capable to keep two separate communication channels by running two protocol stacks concurrently. For example, GSM protocol stack and LTE protocol stack or 2 GSM protocol stacks, one for voice and one for data.

In some exemplary embodiments of the disclosed subject matter, the benefits resulting from utilizing the present disclosure can be, however not limited to:
 a. Abolish the need for switching SIM card during international travel.
 b. Benefit from local data and voice rates while roaming.

c. Take advantage of short and long term data plans, postpaid and prepaid tariff plans not available while roaming.
d. Switching from MSP to another is as simple as, a click of a button.
e. Freedom to choose any MSP that has coverage per particular area.

Referring now to FIG. 1, showing a mobile terminal (MT) 100, in a mobile network (MN) 1, which supports SIM virtualization, in accordance with some exemplary embodiments of the disclosed subject matter. MT 100 may be a computerized apparatus; such as mobile phone, smartphone, mobile hotspot, tablet, smart watch, alarm systems, machine to machine (M2M), a combination thereof, or the like.

Figure 1A:
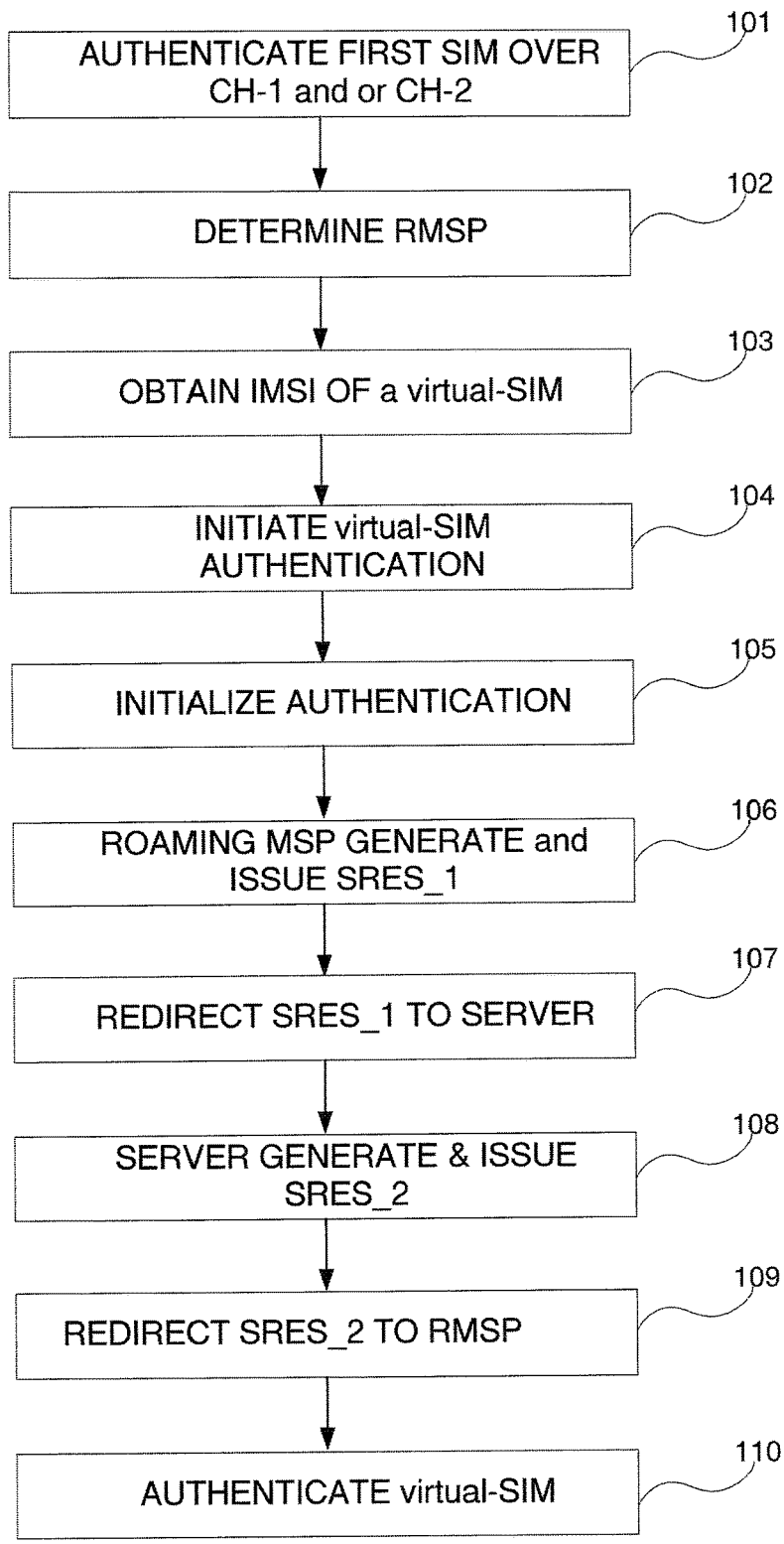
FIG. 1A shows a flowchart diagram of a process for acquiring and authenticating virtual-SIM, in accordance with some exemplary embodiments of the disclosed subject matter.

In some exemplary embodiments, the MT 100 may comprise an application processor (AP) 110. The AP 110 may be a central processing unit (CPU), a microprocessor, an electronic circuit, a plurality of integrated circuits (IC), a combination thereof, or the like. The AP 110 may be utilized to perform computations required by the MT 100, or any of it subcomponents, to perform methods, such as depicted in FIG. 1A, for acquiring at least one virtual-SIM (to be described below) and authenticate the MT 100 with at least one MSP network.

In some exemplary embodiments of the disclosed subject matter, MT 100 may comprise an input-output (I/O) module 112. The I/O module 112 may be utilized as an interface to transmit and/or receive information and instructions between AP 110 and internal or external subsystems (not shown), such as display, Wi-Fi, module, audio components, sensors, actuators, keyboard, touch-screen, augmented reality glasses, external devices, a combination thereof, or the like. All of which may be used to provide a user's interface capabilities such as, data entry inputs, commands inputs, outputs, visualized images, reports, a combination thereof, or the like.

Additionally or alternatively, the internal or external subsystems may comprise connectivity components, such as modems, at list one SIM card, and radio transceivers, used to perform connectivity tasks; such as Wi-Fi, cellular communication, or the like.

In some exemplary embodiments, the MT 100 may comprise a memory 111. The memory 111 may be a hard disk drive, a flash disk, a random access memory (RAM), a memory chip, a flash memory, a combination thereof, or the like. In some exemplary embodiments, memory 111 may be used to retain software components, operating system, program, applications, instructions, functions, and source code files that are operative to cause the AP 110 to perform acts associated with the MT 110 and any of the subcomponents the perform methods such as depicted in FIG. 1A.

In some exemplary embodiments, the MT 100 may comprise a modem 140. The modem 140 may be a commercially available component, such as a chipset, a device, an electronic circuit, a plurality of integrated circuits (IC), a combination thereof, or the like. The modem 140 may also comprise cellular radio frequency (RF) frontend configured for transceiving information (voice and data) over cellular radio bands that comply with cellular radio technologies incorporated in digital cellular generations, i.e. 2G, 3G, 4G, LTE, 5G generations of cellular networks.

In some exemplary embodiments, the modem 140 may be capable of communicating simultaneously with at least two mobile networks of different or same MSP. To do so, modem 140 may comprise a concurrent protocol stack capability, which allows for simultaneous communication over CH-1 and CH-2. In some exemplary embodiments, the modem 140 may be configured to perform concurrent communication over at least one RF channel, utilizing time division multiplexing (TDM) technology. Alternatively, TDM may not be utilized if modem 140 utilizes two separate RF channels.

Some of dual SIM modems, such as DSDA (Dual Sim Dual Active) or DSDS (Dual Sim Dual Standby) have the concurrent protocol stack capability. These modems allow simultaneous communication over CH-1 and CH-2. These modems could be used as the modem 140. Additionally or alternatively, a single SIM modems comprising concurrent stack capability may be used as the modem 140. As an example, a modem that has an ability to execute GSM protocol stack and LTE protocol stack concurrently, so GSM RAT (Radio Access Technology) could be used to establish CH-1, while LTE RAT could be used to establish CH-2 simultaneously.

Additionally or alternatively, new category of modems which may be developed may support virtual sim cards. These modems may have concurrent protocol stack capability and may be used as the modem 140 of the present disclosure. As an example, such modem can have an ability to execute two different LTE protocol stacks concurrently. These modems allow simultaneous communication over CH-1 and CH-2 and may be utilized to provide the features depicted in the present disclosure.

In some exemplary embodiments, the MT 100 may comprise slots 121 and 122. The slots may be connectors configured to accommodate integrated circuit cards, wherein the connector's terminals are wired to the MT 100. It should be noted that, an integrated circuit cards that may be inserted into slots 121 and 122 can be a universal integrated circuit cards (UICC), generally available in 3 form factors: mini, micro and nano. The UICC may be a smart card comprised of a CPU, I/O circuits and memory components that retain applications, such as SIM applications as well as data associated with the subscriber.

It will be noted that, the primary utilization of the UICC (inserted into an MT slot) may be either, SIM or USIM applications. It will also be noted that, the terms SIM card, USIM card, SIM, USIM and UICC are loosely used in the present disclosure, however they are all referring to a system based on UICC smart card (hardware) that implements SIM functionality (software). It should be also be noted that, components comprised in any of the mobile terminals, described in the present disclosure and a combination thereof, may be a part of an system on a chip (SoC).

In some exemplary embodiments, the MT 100 may comprise SIM 131 and SIM 132, which may be inserted in slots 121 and 122 respectively.

In some exemplary embodiments, the MT 100 may comprise a plurality of internal communication buses; such as at least one attention bus (ATB) 151; at least one internet protocol (IP) data bus 161; synchronous serial communication bus (SSB) 171, SSB 172; a combination thereof, or the like. The at least one ATB 151 may be a serial communication bus configured to pass commands and status between AP 110 and modem 140. The at least one IP 161 may be a serial communication bus, such as universal serial bus (USB); media-independent interface (MII), a combination thereof, or the like. The at least one IP 161 may be configured to exchange information between modem 140 and AP 110. In some exemplary embodiments, SSB 171 is configured to exchange information between modem 140 and SIM 131; on the other hand SSB 172 may pass information between modem 140, via selector 113, with either SIM 132 or AP 110. It should be noted that, AP 110 may establish connection between modem 140 with either SIM 131 or AP 110, via SSB 172, by controlling selector 113.

In some exemplary embodiments of the disclosed subject matter, MT 100 may communicate over at least one channel, such as CH-1 and CH-2, with at least one mobile network (MN) 1 via antenna 144. MN 1 may comprise a plurality of cells, such as cells 10 and 20, operated by different MSPs or the same MSP, wherein each of which has the capability of connecting with the Internet WWW 30. In some exemplary embodiments, MN 1 may comprise a SIM-server 31, used for central management of virtual-SIM implementation in MN 1. The SIM-server 31 may be deployed on a cloud computing service, such as amazon web services (AWS), and may utilize a SIM bank 32 that enables storage of a plurality of SIM cards.

It should be noted that SIM bank 32 may comprise a plurality of physical SIM cards, a plurality of SIM profiles stored in a repository of the SIM bank 32 (not shown), a combination thereof, or the like. It should also be noted that SIM bank 32 may be an integral part of SIM-server 31, physically connected (external) to SIM-server 31, connected to SIM-server 31 via the Internet WWW 30, a combination thereof, or the like. It will be appreciated that SIM bank 32 facilitates SIM-server 31 in the process of allocating and authenticating virtual SIM. Thus, for the sake of convenience wherever SIM-server 31 is mentioned throughout the present disclosure also includes SIM bank 32. In some exemplary embodiments, a mobile terminal of the present disclosure communicate with SIM-server 31 and SIM bank 32 for allocating a virtual SIM profile and authenticating the virtual SIM profile may be based on actual SIM profiles and or physical SIMs stored and or comprised within the SIM bank 32 and or a combination thereof.

Referring now to FIG. 1A showing a flowchart diagram of a process for acquiring and authenticating virtual-SIM, in accordance with some exemplary embodiments of the disclosed subject matter.

It should be noted that, the flowchart diagram, of FIG. 1A, described herein refers to, but not limited to, the elements depicted in FIG. 1.

In Step 101, SIM 131 may be authenticated over CH-1. In some exemplary embodiments, SIM 131 may be a native-SIM, from which the MT 100 obtain an international mobile subscriber identity (IMSI) and pass it over CH-1 to an available MSP in MN 1, in order to authenticate SIM 131 with the available MSP. Upon acquiring the IMSI, the MSP challenge the SIM 131 of MT 100 with an SRES_1, which may be responded, by SIM 131, with SRES_2. A proper match between SRES_1 and SRES_2 enables the MSP to grant SIM 131 access to the network.

It should be noted that, a native-SIM may be the SIM that a subscriber (MT user) use when not roaming, in other words, when using the MT in a territory covered by the MSP that provided the native-SIM.

In some exemplary embodiments, the authentication of SIM 131 may be initiated by AP 110, which instructs modem 140 via ATB 151 to obtain the IMSI of SIM 131, thru SSB 171, and transmit it over CH-1 to MN 1. In addition modem 140 may facilitate communication between SIM 131 and the available MSP, whenever MT 100 communicates over CH-1.

In Step 102, a roaming MSP (RMSP) may be determined. In some exemplary embodiments, AP 110 may identify the country and the area codes in which the MT 100 is present, by either IP address query, GPS analysis, available MSPs of the previous step, a combination thereof, or the like. In some exemplary embodiments, AP 110 may determine the most appropriate RMSP for roaming, based on network code, area code, signal strength, network availability, and cost criteria's, in which the MT 100 is present.

In Step 103, an IMSI of a virtual-SIM may be obtained. In some exemplary embodiments, AP 110 communicate with SIM-server 31 via IP 161, modem 140, over CH-1 and thru WWW 30, to request an IMSI of a virtual-SIM from the RMSP. Following the request the SIM-server 31 may reply to the AP 110 of MT 100 with an IMSI of a virtual-SIM, via the same path the request arrived.

In Step 104, the virtual-SIM authentication may be initiated. In some exemplary embodiments, the IMSI, of the virtual-SIM, may be communicated from AP 110 to modem 140 and SIM 132 via SSB 172. Additionally, or alternatively, that IMSI may be first stored by AP 110 to SIM 132 and then communicated from SIM 132 to modem 140 via SSB 172. It will be noted that these two alternatives, of passing the IMSI to modem 140, utilize selector 113 that may be controlled by AP 110.

In Step 105, the virtual-SIM authentication may be initialized. In some exemplary embodiments, AP 110 instructs modem 140, via ATB 151, to activate CH-2 and establish communication with SIM 132, which retain the IMSI, of the virtual-SIM, over SSB 172. The authentication may be initialized, upon passing the IMSI, of the virtual-SIM, by modem 140 to the RMSP network over CH-2.

In Step 106, the RMSP may generate and issue SRES_1. In some exemplary embodiments, the RMSP generate an SRES_1 challenge and transmitted to AP 110 via CH-2, modem 140, SSB 172 and selector 113.

It will be noted that in the present disclosure, generating an SRES_1 by an RMSP may involve: searching the RMSP database for the IMSI of the given virtual-SIM, extracting the IMSI associated (K) key, and determining the SRES_1 challenge based on the (K) key.

In Step 107, SRES_1 may be redirected to the SIM server. In some exemplary embodiments, upon capturing SRES_1, AP 110 pass it via IP 161 and modem 140 to SIM-server 31 over CH-1.

In Step 108, the SIM-server 31 may generate and issue an SRES_2 response. In some exemplary embodiments, upon receiving the SRES_1, SIM-server 31 may determine the SRES_2 for the virtual-SIM and transmit it back to AP 110 via CH-1, modem 140 and IP 161.

In Step 109, SRES_2 may be redirected to the RMSP. In some exemplary embodiments, upon capturing SRES_2, AP 110 pass it via IP 161 and modem 140 to the RMSP network over CH-2.

In Step 110, the RMSP may authenticate the virtual-SIM. In some exemplary embodiments, the authentication may be determined by verifying that the SRES_2 reply comply with the SRES_1 challenge. Upon successful authentication, MT 100 may be granted access to the RMSP network, wherein AP 110 may communicate with the RMSP network via IP 161 and modem 140 over CH-2.

Figure 2:
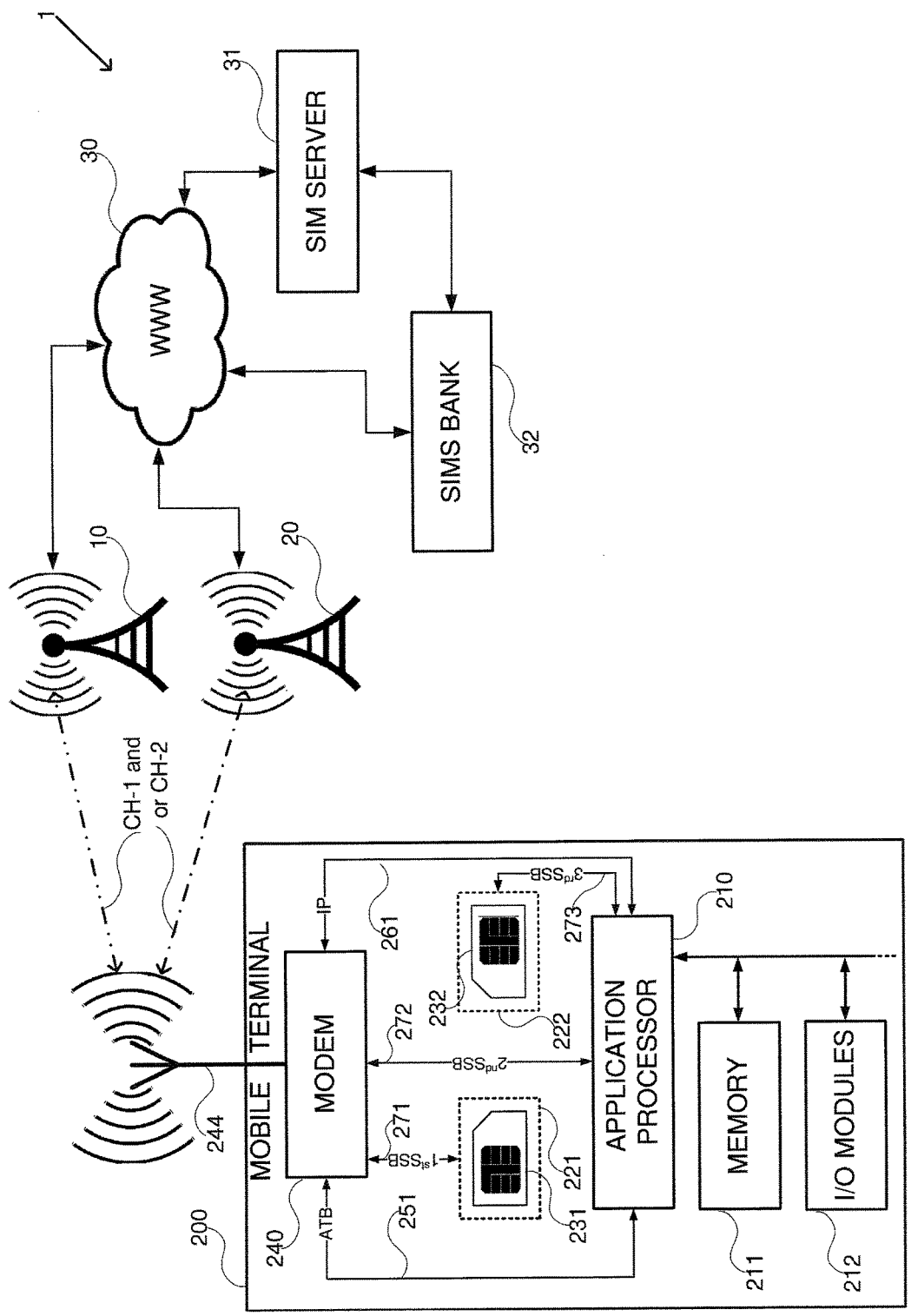
FIG. 2 shows a block diagram of a MT, in a mobile network environment, in accordance with some exemplary embodiments of the disclosed subject matter.

Referring now to FIG. 2, showing a mobile terminal (MT) 200, in MN 1, which supports SIM virtualization, in accordance with some exemplary embodiments of the disclosed subject matter. MT 200 may be a computerized apparatus; such as mobile phone, smartphone, mobile hotspot, tablet, smart watch, alarm systems, machine to machine (M2M), a combination thereof, or the like.

Figure 2A:
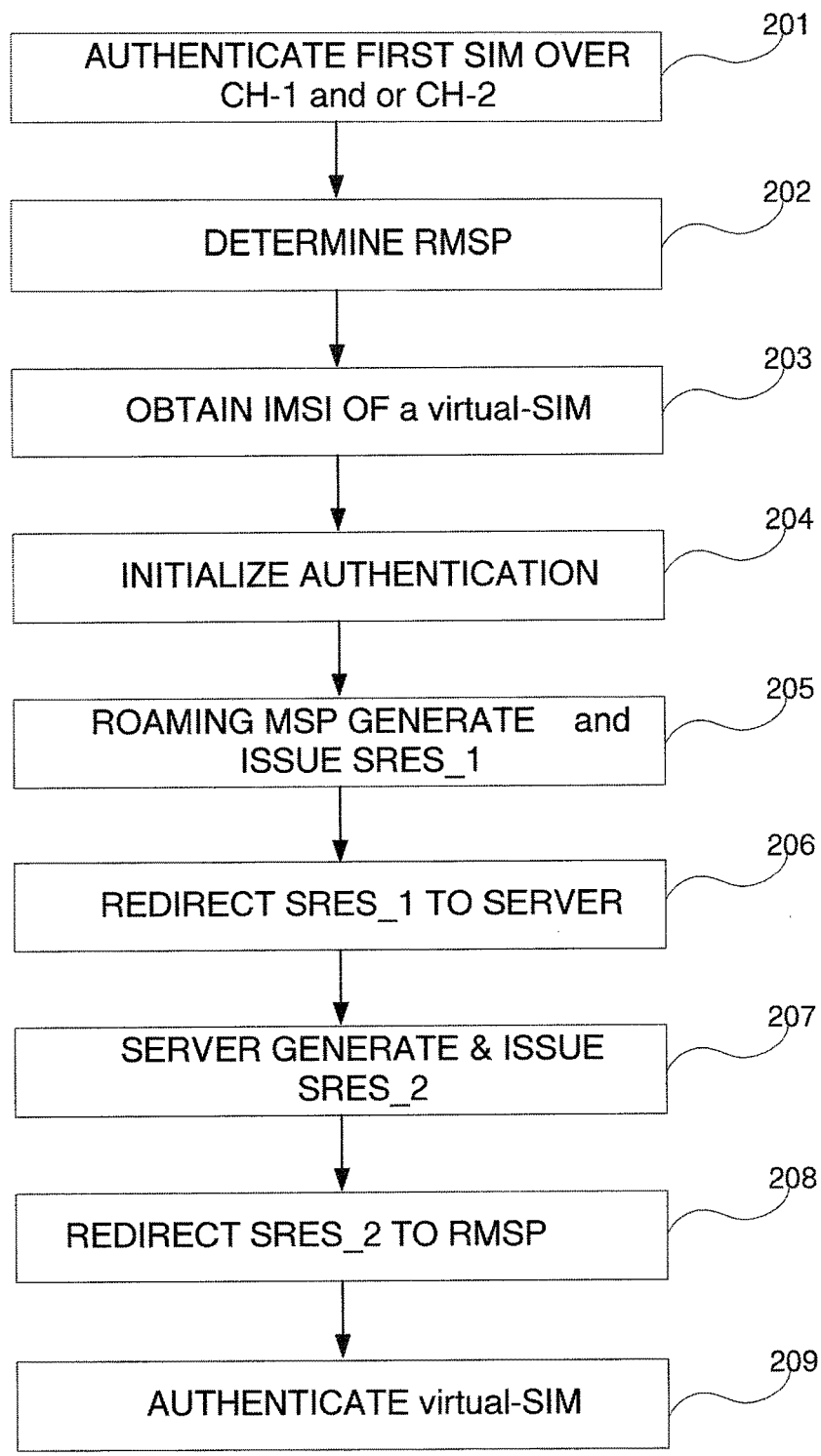
FIG. 2A shows a flowchart diagram of a process for acquiring and authenticating virtual-SIM, in accordance with some exemplary embodiments of the disclosed subject matter.

In some exemplary embodiments, the MT 200 may comprise an AP 210, such as the AP 110 depicted in FIG. 1. The AP 210 may be utilized to perform computations required by the MT 200 or any of it subcomponents to perform methods, such as depicted in FIG. 2A, for acquiring at least one virtual-SIM and authenticate the MT 200 with at least one MSP network.

In some exemplary embodiments of the disclosed subject matter, MT 200 may comprise an I/O module 212, such as the I/O module 112 depicted in FIG. 1. The I/O module 212 may be utilized to perform duties similar to the duties performed by the I/O module 112 of FIG. 1. Additionally or alternatively, the duties of the I/O module 212 may comprise interfacing between AP 210 and internal/external subsystems components, such as modems, at list one SIM card, and radio transceivers, used to perform connectivity tasks; such as Wi-Fi, cellular communication, or the like.

In some exemplary embodiments, the MT 200 may comprise a memory 211, such as the memory 111 depicted in FIG. 1. Memory 211 may retain software components that are operative to cause the processor 210 to perform methods, such as depicted in FIG. 2A, associated with the MT 200 and any of the subcomponents to perform.

In some exemplary embodiments, the MT 200 may comprise a modem 240, such as modem 140 depicted in FIG. 1. Modem 240 may be capable to communicate (transmit & receive) information via antenna 244, over at least two separate channels, (e.g. CH-1 and CH-2) concurrently. In some exemplary embodiments, CH-1 and CH-2 communicate with mobile network, such as the MN 1 (previously described in FIG. 1) via the same cell, different cells, same MSP, different MSPs, a combination thereof, or the like.

In some exemplary embodiments, MT 200 may comprise slots 221 and 222, such as slots 121 and 122, of FIG. 1, respectively. The MT 200 may also comprise SIM 231 and SIM 232, such as SIM 131 and SIM 132, of FIG. 1, respectively. In some exemplary embodiments, SIM 231 and SIM 232 may be inserted into slots 221 and 222 respectively.

In some exemplary embodiments, the MT 200 may comprise internal communication buses; such as at least one ATB 251; at least one IP 261; SSB 271, SSB 272; a combination thereof, or the like. It should be reminded that several characteristics of the internal communication buses listed herewith are described in FIG. 1.

The at least one ATB 251 may be configured to pass commands and status between AP 210 and modem 240. The at least one IP 261 may be configured to exchange information between modem 240 and AP 210. Additionally, SSB 271 may be configured to exchange information between modem 240 and SIM 231, likewise SSB 272 between modem 240 and AP 210; and SSB 272 between AP 210 and SIM 232.

Referring now to FIG. 2A showing a flowchart diagram of a process for acquiring and authenticating virtual-SIM, in accordance with some exemplary embodiments of the disclosed subject matter.

It should be noted that, the flowchart diagram, of FIG. 2A, described herein refers to, but not limited to, the elements depicted in FIG. 2.

In Step 201, SIM 231 may be authenticated over CH-1. In some exemplary embodiments, SIM 231 may be a native-SIM, from which the MT 200 obtain an international mobile subscriber identity (IMSI) and pass it over CH-1 to an available MSP in MN 1, in order to authenticate SIM 231 with the available MSP. Upon acquiring the IMSI, the MSP challenge the SIM 231 of MT 200 with an SRES_1, which may be responded, by SIM 231, with SRES_2. A proper match between SRES_1 and SRES_2 enables the MSP to grant SIM 231 access to the network.

In some exemplary embodiments, the authentication of SIM 231 may be initiated by AP 210, which instructs modem 240 via ATB 251 to obtain the IMSI of SIM 231, thru SSB 271, and transmit it over CH-1 to MN 1. In addition modem 240 may facilitate communication between SIM 231 and the available MSP, whenever MT 500 communicates over CH-1.

In Step 202, a roaming MSP (RMSP) may be determined. In some exemplary embodiments, AP 210 may identify the country and the area codes in which the MT 200 is present, by either IP address query, GPS analysis, available MSPs of the previous step, a combination thereof, or the like. In some exemplary embodiments, AP 210 may determine the most appropriate RMSP for roaming, based on network code, area code, signal strength, network availability, and cost criteria's, in which the MT 200 is present.

In Step 203, an IMSI of a virtual-SIM may be obtained. In some exemplary embodiments, AP 210 communicate with SIM-server 31 via IP 261, modem 240, over CH-1 and thru WWW 30, to request an IMSI of a virtual-SIM from the RMSP. Following the request the SIM-server 31 may reply to the AP 210 of MT 200 with an IMSI of a virtual-SIM, via the same path the request arrived.

In Step 204, the virtual-SIM authentication may be initialized. In some exemplary embodiments, AP 210 may store the IMSI of the virtual-SIM in SIM 232 via SSB 273 and pass that IMSI to modem 240 via SSB 272. After which, the AP 210 instructs modem 240, via ATB 251, to activate CH-2 and initialize authentication by passing the IMSI of the virtual-SIM to the RMSP network over CH-2.

In Step 205, the RMSP may generate and issue SRES_1. In some exemplary embodiments, the RMSP generate an SRES_1 challenge and transmitted to AP 210 via CH-2, modem 240, SSB 172 and selector 213.

In Step 206, SRES_1 may be redirected to the SIM server. In some exemplary embodiments, upon capturing SRES_1, AP 210 pass it via IP 261 and modem 240 to SIM-server 31 over CH-1.

In Step 207, the SIM-server 31 may generate & issue SRES_2. In some exemplary embodiments, upon receiving the SRES_1, SIM-server 31 may determine the SRES_2 for the virtual-SIM and transmit it back to AP 210 via CH-1, modem 240 and IP 261.

In Step 208, SRES_2 may be redirected to the RMSP. In some exemplary embodiments, upon capturing SRES_2, AP 210 pass it thru pass it thru IP 261 and modem 240 to the RMSP network over CH-2.

In Step 209, the RMSP may authenticate the virtual-SIM. In some exemplary embodiments, the authentication may be determined by verifying that the SRES_2 reply comply with the SRES_1 challenge. Upon successful authentication, MT 200 may be granted access to the RMSP network, wherein AP 210 may communicate with the RMSP network via IP 261 and modem 240 over CH-2.

Figure 3:
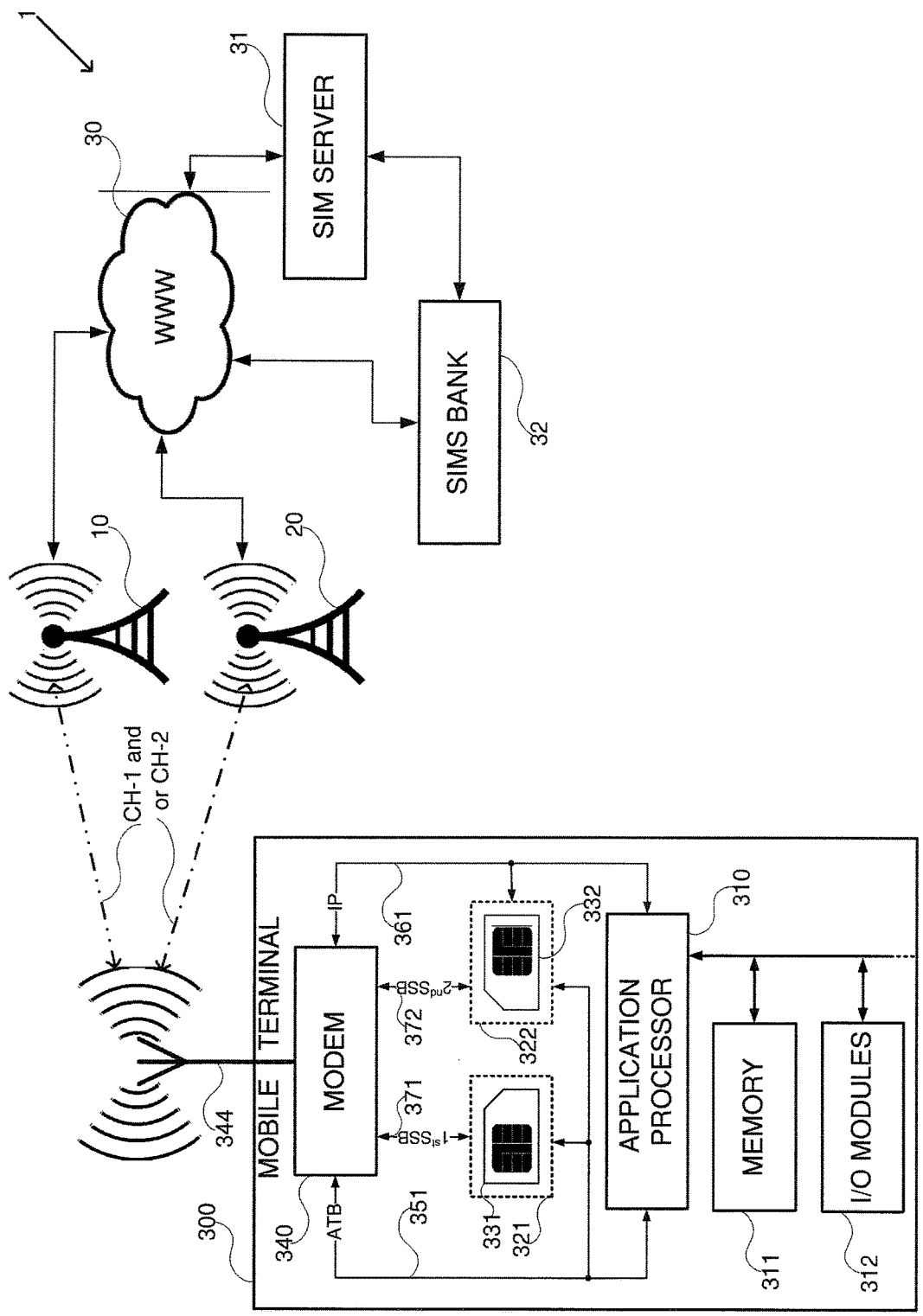
FIG. 3 shows a block diagram of an MT, in a mobile network, in accordance with some exemplary embodiments of the disclosed subject matter.

Referring now to FIG. 3, showing a mobile terminal (MT) 300, in MN 1, which supports SIM virtualization, in accordance with some exemplary embodiments of the disclosed subject matter. MT 300 may be a computerized apparatus; such as mobile phone, smartphone, mobile hotspot, tablet, smart watch, alarm systems, machine to machine (M2M), a combination thereof, or the like.

Figure 3A:
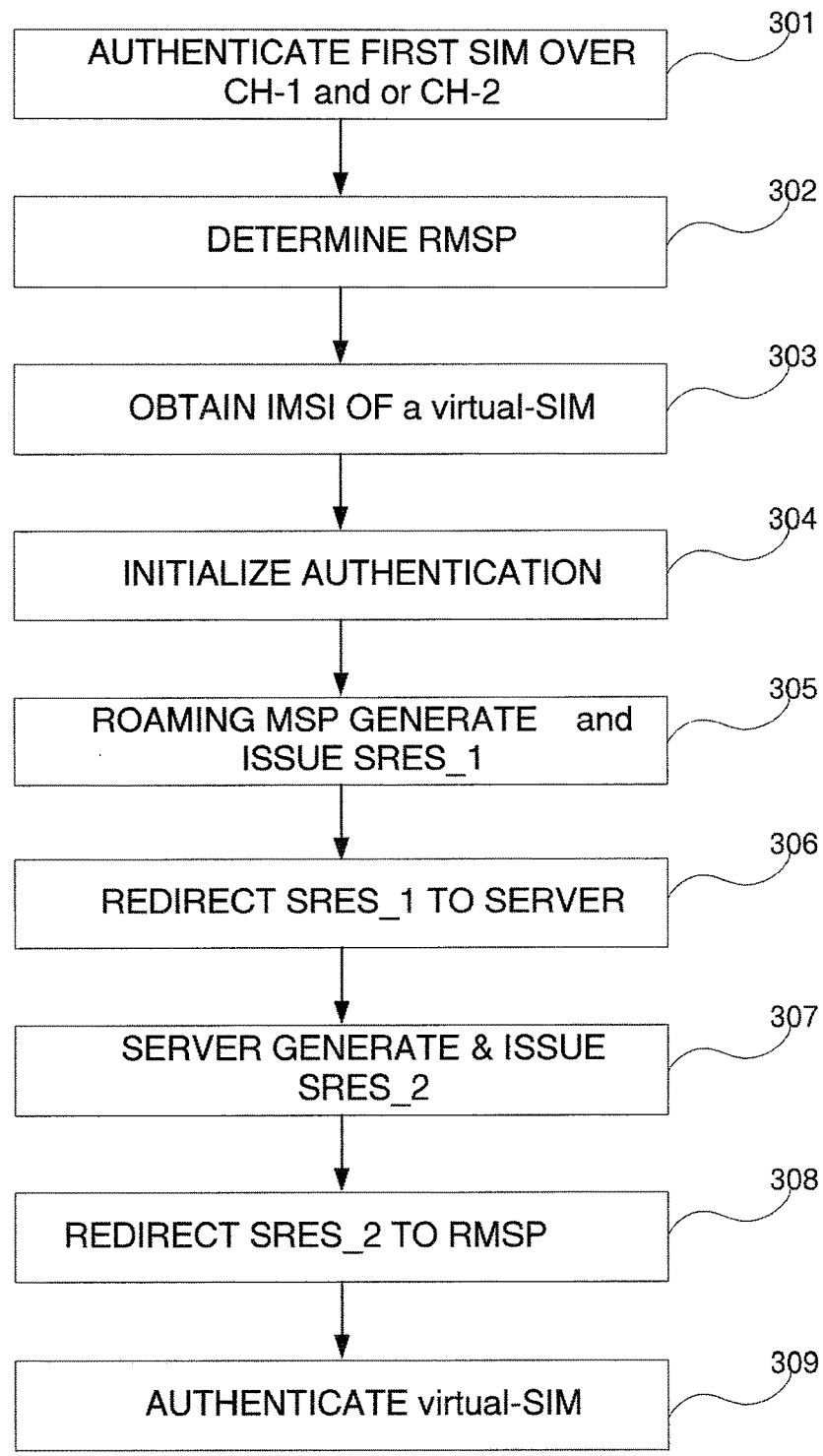
FIG. 3A shows a flowchart diagram of a process for acquiring and authenticating virtual-SIM, in accordance with some exemplary embodiments of the disclosed subject matter.
Figure 3B:
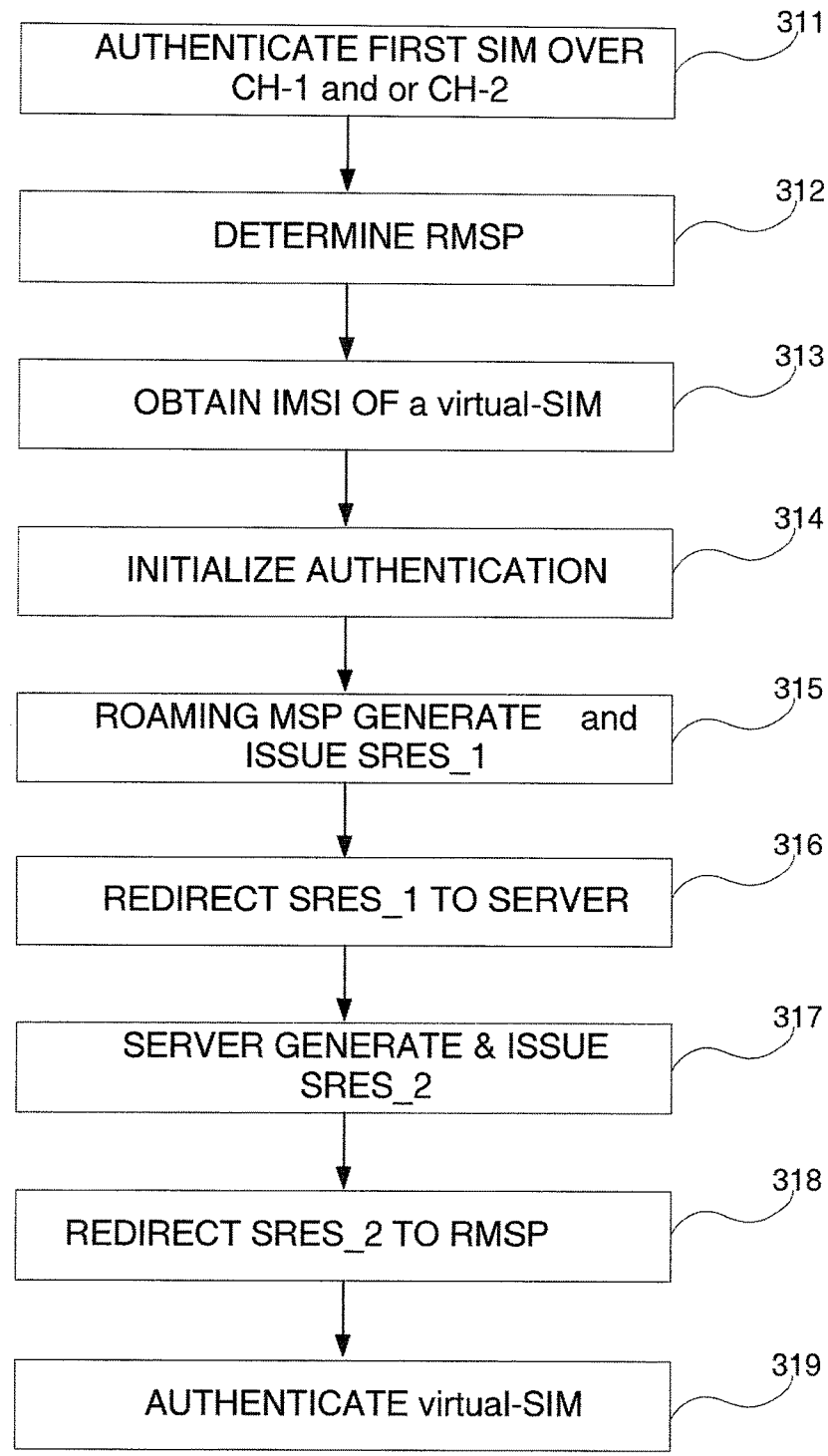
FIG. 3B shows a flowchart diagram of a process for acquiring and authenticating virtual-SIM, in accordance with some exemplary embodiments of the disclosed subject matter.

In some exemplary embodiments, the MT 300 may comprise an AP 310, such as the AP 110 depicted in FIG. 1. The AP 310 may be utilized to perform computations required by the MT 300 or any of it subcomponents to perform methods, such as depicted in FIGS. 3A and 3B, for acquiring at least one virtual-SIM and authenticate the MT 300 with at least one MSP network.

In some exemplary embodiments of the disclosed subject matter, MT 300 may comprise an I/O module 312, such as the I/O module 112 depicted in FIG. 1. The I/O module 312 may be utilized to perform duties similar to the duties performed by the I/O module 112 of FIG. 1. Additionally or alternatively, the duties of the I/O module 312 may comprise interfacing between AP 310 and internal/external subsystems components, such as modems, at list one SIM card, and radio transceivers, used to perform connectivity tasks; such as Wi-Fi, cellular communication, or the like.

In some exemplary embodiments, the MT 300 may comprise a memory 311, such as the memory 111 depicted in FIG. 1. Memory 311 may retain software components that are operative to cause the processor 310 to perform methods, such as depicted in FIGS. 3A and 3B, associated with the MT 300 and any of the subcomponents to perform.

In some exemplary embodiments, the MT 300 may comprise a modem 340, such as the modem 140 depicted in FIG. 1. Modem 340 may be capable to communicate (transmit & receive) information via antenna 344, over at least two channels, (e.g. CH-1 and CH-2) concurrently. In some exemplary embodiments, CH-1 and CH-2 communicate with mobile network, such as the MN 1 (previously described in FIG. 1) via the same cell, different cells, same MSP, different MSPs, a combination thereof, or the like.

In some exemplary embodiments, MT 300 may comprise slots 321 and 322, such as slots 121 and 122, of FIG. 1, respectively. MT 300 may also comprise SIM 331 (such as SIM 131, of FIG. 1) and a Keepgo integrated circuit card (KICC) 332. In some exemplary embodiments, KICC 332 may be a proprietary smart card that comprises SIM functionality. Additionally or alternatively, KICC 332 may be configured to facilitate virtual-SIM authentication of mobile terminals utilizing, commercially available, modems that communicate over two channels. In some exemplary embodiments, SIM 331 and KICC 332 may be inserted into slots 321 and 322 respectively.

In some exemplary embodiments, the MT 300 may comprise internal communication buses; such as at least one ATB 351; at least one IP 361; SSB 371, SSB 372; a combination thereof, or the like. It should be reminded that several characteristics of the internal communication buses listed herewith are described in FIG. 1.

The at least one ATB 251 may be configured to pass commands and status between AP 310, modem 340 and SIM 332. The at least one IP 361 may be configured to exchange information between modem 340, SIM 332 and AP 310. Additionally, SSB 371 may be configured to exchange information between modem 340 and SIM 331, while SSB 372 may pass information between modem 340 and SIM 332

Referring now to FIG. 3A showing a flowchart diagram of a process for acquiring and authenticating virtual-SIM, in accordance with some exemplary embodiments of the disclosed subject matter.

It should be noted that, the flowchart diagram, of FIG. 3A, described herein refers to, but not limited to, the elements depicted in FIG. 3.

In Step 301, SIM 331 may be authenticated over CH-1. In some exemplary embodiments, SIM 331 may be a native-SIM, from which the MT 300 obtain an IMSI and pass it over CH-1 to an available MSP in MN 1, in order to authenticate SIM 331 with the available MSP.

Upon acquiring the IMSI, the MSP challenge the SIM 331 of MT 300 with an SRES_1, which may be responded, by SIM 331, with SRES_2. A proper match between SRES_1 and SRES_2 enables the MSP to grant SIM 331 access to the network.

In some exemplary embodiments, the authentication of SIM 331 may be initialized by AP 310, which instructs modem 340 via ATB 351 to obtain the IMSI of SIM 331, thru SSB 371, and transmit it over CH-1 to MN 1. In addition modem 340 may facilitate communication between SIM 331 and the available MSP, whenever MT 500 communicates over CH-1.

In Step 302, a RMSP may be determined. In some exemplary embodiments, AP 310 may identify the country and the area codes in which the MT 300 is present, by either IP address query, GPS analysis, available MSPs of the previous step, a combination thereof, or the like. In some exemplary embodiments, AP 310 may determine the most appropriate RMSP for roaming, based on network code, area code, signal strength, network availability, and cost criteria's, in which the MT 300 is present.

In Step 303, an IMSI of a virtual-SIM may be obtained. In some exemplary embodiments, AP 310 communicate with SIM-server 31 via IP 361, modem 340 over CH-1 and thru WWW 30, to request an IMSI of a virtual-SIM from the RMSP. Following the request, SIM-server 31 may reply to AP 310 with an IMSI of a virtual-SIM, via the same path the request arrived. In some exemplary embodiments, the virtual-SIM IMSI may be stored in KICC 332.

In Step 304, the virtual-SIM authentication may be initialized. In some exemplary embodiments, KICC 332 may pass the IMSI, of the virtual-SIM, to modem 340 via SSB 372 and instruct the modem 340, via ATB 351, to initialize authentication by passing the virtual-SIM IMSI to the RMSP network over CH-2.

In Step 305, the RMSP may generate and issue SRES_1. In some exemplary embodiments, the RMSP generate an SRES_1 challenge and transmitted to KICC 332 via CH-2, modem 340 and SSB 372.

In Step 306, SRES_1 may be redirected to the SIM-server 31. In some exemplary embodiments, upon capturing SRES_1, KICC 332 pass the SRES_1 via IP 361 and modem 340 to SIM-server 31 over CH-1.

In Step 307, the SIM-server 31 may generate & issue SRES_2. In some exemplary embodiments, upon receiving the SRES_1, SIM-server 31 may determine the SRES_2 for the virtual-SIM and transmit it back to KICC 332 via CH-1, modem 340 and IP 361.

In Step 308, SRES_2 may be redirected to the RMSP. In some exemplary embodiments, upon capturing SRES_2, KICC 332 pass it via IP 361 and modem 340 to the RMSP network over CH-2.

In Step 309, the RMSP may authenticate the virtual-SIM. In some exemplary embodiments, the authentication may be determined by verifying that the SRES_2 reply comply with the SRES_1 challenge. Upon successful authentication, MT 300 may be granted access the RMSP network, wherein MT 300 may communicate with the RMSP network via IP 361 and modem 340 over CH-2.

Referring now to FIG. 3B showing a flowchart diagram of a process for acquiring and authenticating virtual-SIM, in accordance with some exemplary embodiments of the disclosed subject matter.

It should be noted that, the flowchart diagram, of FIG. 3B, described herein refers to, but not limited to, the elements depicted in FIG. 3. It should also be noted that in the exemplary embodiment of FIG. 3B described herein, slot 321 may be populated with KICC 331 while slot 322 may be redundant or populated with a SIM that doesn't participate in the process for acquiring and authenticating virtual-SIM. In some exemplary embodiments, the properties of KICC 331 may be similar to the KICC 332. In addition, a subset of KICC 331 may comprise native-SIM functionalities, such as SIM 131, of FIG. 1.

In Step 311, KICC 331 may be authenticated over CH-1. In some exemplary embodiments, the MT 300 may obtain an IMSI from the native SIM subset of the KICC 331 and pass it over CH-1 to an available MSP in MN 1, in order to authenticate KICC 331 with an available MSP.

Upon acquiring the IMSI, the available MSP challenge KICC 331 with an SRES_1, which may be responded, by KICC 331, with SRES_2. A proper match between SRES_1 and SRES_2 enables the MSP to grant SIM 231 access to the network.

In some exemplary embodiments, the authentication of KICC 331 may be initialized by AP 310, which instructs modem 340, via ATB 351, to obtain the IMSI from the native SIM subset of the KICC 331, thru SSB 371, and transmit it over CH-1 to the available MSP in MN 1. In addition, modem 340 may facilitate communication between the native SIM subset of the KICC 331 and the available MSP throughout the process of communicating over CH-1.

In Step 312, an RMSP may be determined. In some exemplary embodiments, AP 310 may identify the country and the area codes in which the MT 300 is present, by either IP address query, GPS analysis, available MSPs of the previous step, a combination thereof, or the like. In some exemplary embodiments, AP 310 may determine the most appropriate RMSP for roaming, i.e. roaming MSP (RMSP), based on network code, area code, signal strength, network availability, and cost criteria's, in which the which the MT 300 is located.

In Step 313, an IMSI of a virtual-SIM may be obtained. In some exemplary embodiments, KICC 331 communicate with SIM-server 31 via IP 361, modem 340, over CH-1 and thru WWW 30, to request an IMSI of a virtual-SIM from the RMSP. Following the request the SIM-server 31 may reply to the KICC 331 with an IMSI of the virtual-SIM, via the same path the request arrived. The step may be concluded upon storing the IMSI of the virtual-SIM into KICC 331.

In Step 314, the virtual-SIM authentication may be initialized. In some exemplary embodiments, AP 310 instructs modem 340 thru ATB 351 to obtain the IMSI, of the virtual-SIM, from KICC 331, and initialize authentication by passing that IMSI to the RMSP network over CH-2. It should be noted that, KICC 331 have the capability to emulate, a native-SIM and virtual-SIM, as well as alternate between them as needed.

In Step 315, the RMSP may generate and issue SRES_1. In some exemplary embodiments, the RMSP generate an SRES_1 challenge and transmitted to KICC 331, via CH-2, modem 340 and SSB 372. The KICC 331 may also retain the SRES_1.

In Step 316, SRES_1 may be redirected to the SIM-server 31. In some exemplary embodiments, upon capturing SRES_1, AP 310 may toggle, via ATB 351, KICC 331 to native-SIM and instructs it to pass the SRES_1 via modem 340 to SIM-server 31 over CH-1.

In Step 317, the SIM-server 31 may generate & issue SRES_2. In some exemplary embodiments, upon receiving the SRES_1, SIM-server 31 may determine the SRES_2 for the virtual-SIM and transmit it back to KICC 331 via CH-1, modem 340 and IP 361.

In Step 318, SRES_2 may be redirected to the RMSP. In some exemplary embodiments, upon capturing SRES_2, KICC 332 may be toggled back to its virtual-SIM identity and pass the SRES_2 via modem 340 to the RMSP network over CH-2.

In Step 319, the RMSP may authenticate the virtual-SIM. In some exemplary embodiments, the authentication may be determined by verifying that the SRES_2 reply comply with the SRES_1 challenge. Upon successful authentication, MT 300 may be granted access the RMSP network, wherein KICC 331 may communicate with the RMSP network via IP 361 and modem 340 over CH-2.

Figure 4:
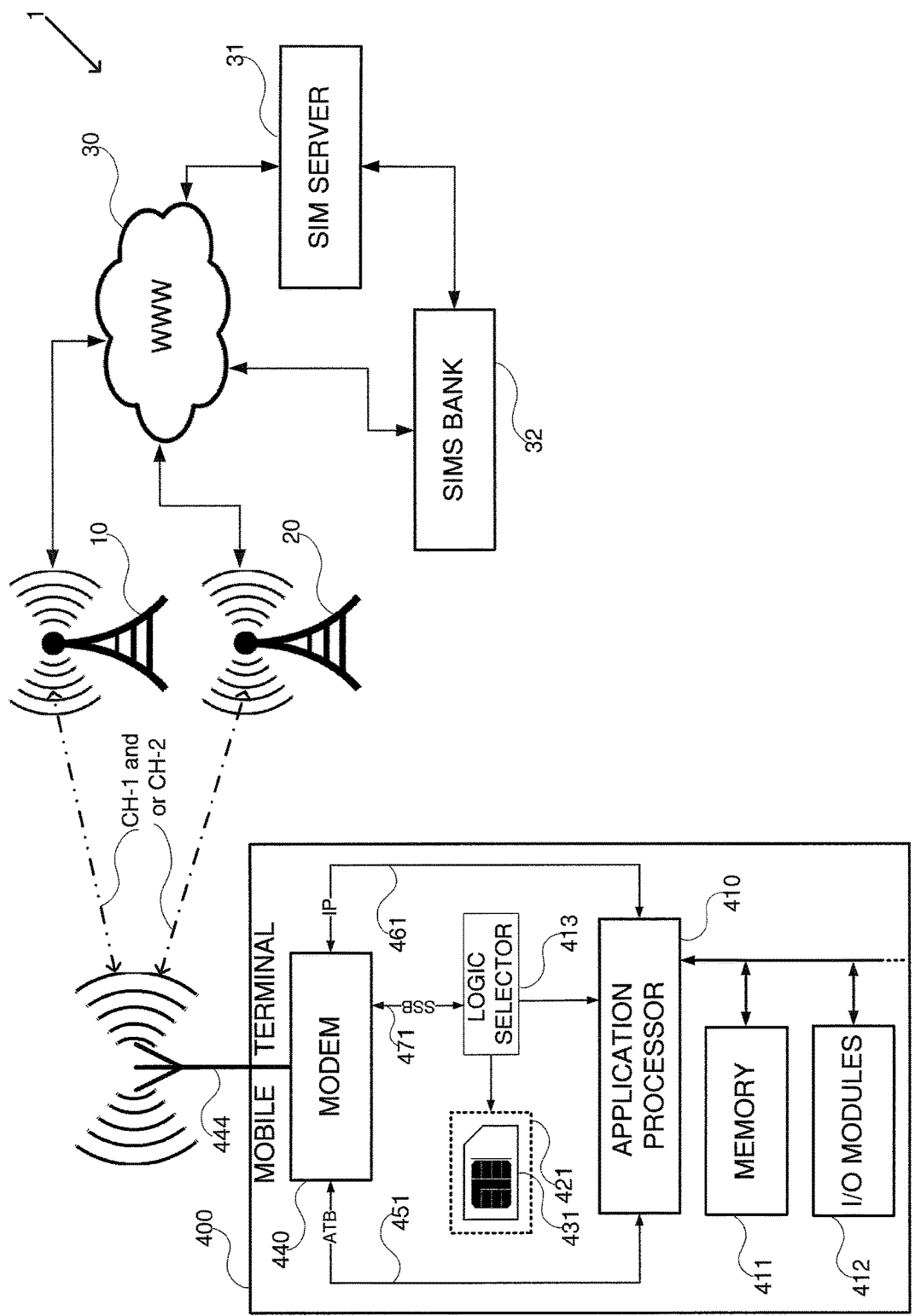
FIG. 4 shows a block diagram of an MT, in a mobile network, in accordance with some exemplary embodiments of the disclosed subject matter.

Referring now to FIG. 4, showing a mobile terminal (MT) 400, in MN 1, which supports SIM virtualization, in accordance with some exemplary embodiments of the disclosed subject matter. MT 400 may be a computerized apparatus; such as mobile phone, smartphone, mobile hotspot, tablet, smart watch, alarm systems, machine to machine (M2M), a combination thereof, or the like.

Figure 4A:
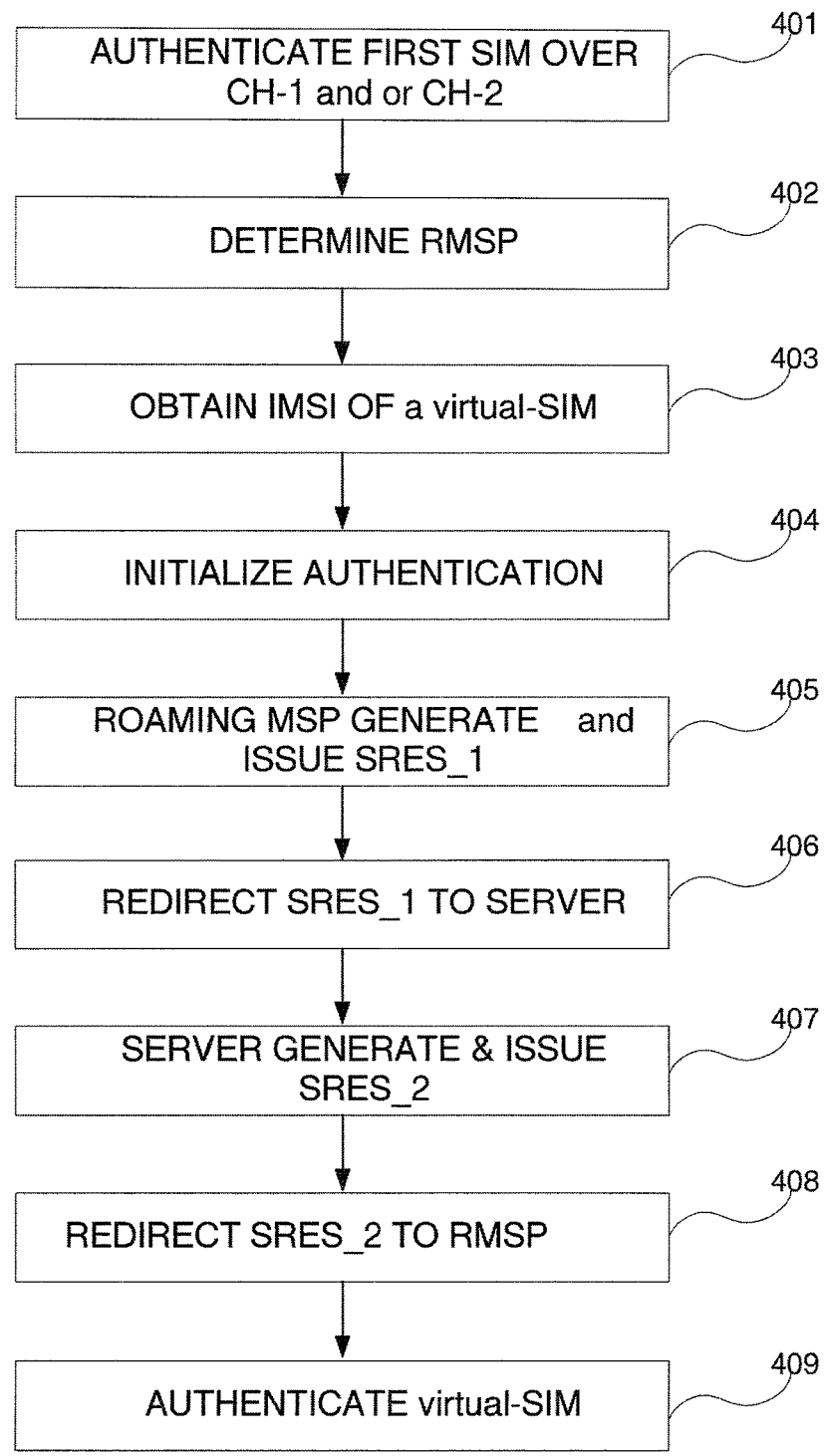
FIG. 4A shows a flowchart diagram of a process for acquiring and authenticating virtual-SIM, in accordance with some exemplary embodiments of the disclosed subject matter.

In some exemplary embodiments, the MT 400 may comprise an AP 410, such as the AP 110 depicted in FIG. 1. The AP 410 may be utilized to perform computations required by the MT 400 or any of it subcomponents to perform methods, such as depicted in FIG. 4A, for acquiring at least one virtual-SIM and authenticate the MT 400 with at least one MSP network.

In some exemplary embodiments of the disclosed subject matter, MT 400 may comprise an I/O module 412, such as the I/O module 112 depicted in FIG. 1. The I/O module 412 may be utilized to perform duties similar to the duties performed by the I/O module 112 of FIG. 1. Additionally or alternatively, the duties of the I/O module 412 may comprise interfacing between AP 410 and internal/external subsystems components, such as modems, at list one SIM card, and radio transceivers, used to perform connectivity tasks; such as Wi-Fi, cellular communication, or the like.

In some exemplary embodiments, the MT 400 may comprise a memory 411, such as the memory 111 depicted in FIG. 1. Memory 411 may retain software components that are operative to cause the processor 410 to perform methods, such as depicted in FIG. 4A, associated with the MT 400 and any of the subcomponents to perform.

In some exemplary embodiments, the MT 400 may comprise a modem 440, such as the modem 140 depicted in FIG. 1. Modem 440 may be capable to communicate (transmit & receive) information via antenna 444, over at least two separate channels, (e.g. CH-1 and CH-2) concurrently. In some exemplary embodiments, CH-1 and CH-2 communicate with mobile network, such as the MN 1 (previously described in FIG. 1) via the same cell, different cells, same MSP, different MSPs, a combination thereof, or the like.

In some exemplary embodiments, MT 400 may comprise slots 421, such as slots 121, of FIG. 1. The MT 400 may also comprise SIM 431, such as SIM, of FIG. 1. In some exemplary embodiments, SIM 431 may be inserted into slots 421.

In some exemplary embodiments, the MT 200 may comprise internal communication buses; such as at least one ATB 451, at least one IP 461, SSB 471, a combination thereof, or the like. It should be reminded that several characteristics of the internal communication buses listed herewith are described in FIG. 1.

The at least one ATB 451 may be configured to pass commands and status between AP 410 and modem 440. The at least one IP 461 may be configured to exchange information between modem 440 and AP 410. Additionally, SSB 271 may be configured to exchange information between modem 440 and either SIM 431 or AP 410 via logic selector 413. In some exemplary embodiments, may be implemented within the AP 410 software or firmware.

Referring now to FIG. 4A showing a flowchart diagram of a process for acquiring and authenticating virtual-SIM, in accordance with some exemplary embodiments of the disclosed subject matter.

It should be noted that, the flowchart diagram, of FIG. 4A, described herein refers to, but not limited to, the elements depicted in FIG. 4.

In Step 401, SIM 431 may be authenticated over CH-1. In some exemplary embodiments, SIM 431 may be a native-SIM, from which the MT 400 obtain an IMSI and pass it over CH-1 to an available MSP in MN 1, in order to authenticate SIM 431 with the available MSP. Upon acquiring the IMSI, the MSP challenge SIM 431 with an SRES_1, which may be responded, by SIM 431, with SRES_2. A proper match between SRES_1 and SRES_2 enables the MSP to grant SIM 431 access to the network.

In some exemplary embodiments, the authentication of SIM 431 may be initialized by AP 410, which instructs modem 440 via ATB 451 to obtain the IMSI of SIM 431, thru selector 413 and SSB 471, and transmit it over CH-1 to the available MSP in MN 1. It should be noted that, AP 410 toggles logic selector 413 to pass traffic between SIM 431 and modem 440, whenever MT 400 communicates over CH-1. Additionally, modem 440 facilitates communication between SIM 431 and the available MSP, whenever MT 500 communicates over CH-1.

In Step 402, a RMSP may be determined. In some exemplary embodiments, AP 410 may identify the country and the area codes in which the MT 400 is located, by either IP address query, GPS analysis, available MSPs of the previous step, a combination thereof, or the like. In some exemplary embodiments, AP 410 may determine the most appropriate RMSP for roaming, based on network code, area code, signal strength, network availability, and cost criteria's, in which the MT 200 is located.

In Step 403, IMSI of a virtual-SIM may be obtained. In some exemplary embodiments, AP 410 communicate with SIM-server 31 via IP 461, modem 440 over CH-1 and thru WWW 30, to request an IMSI of a virtual-SIM of from the RMSP. Following the request the SIM-server 31 may reply to AP 410 with an IMSI of a virtual-SIM via the same path, the request arrived.

In Step 404, the virtual-SIM authentication may be initialized. In some exemplary embodiments, AP 410 may instruct the logic selector 413 to pass the IMSI of the virtual-SIM to modem 440 via SSB 471. Consequently, AP 410 instructs modem 440, via ATB 151, to activate CH-2 in order to authenticate the virtual-SIM with the RMSP network over CH-2.

In Step 405, the RMSP may generate and issue SRES_1. In some exemplary embodiments, RMSP generate an SRES_1 challenge and transmits it to AP 410 via CH-2, modem 440, SSB 471 and selector 413.

In Step 406, SRES_1 may be redirected to SIM-server 31. In some exemplary embodiments, upon capturing SRES_1, AP 410 pass it thru IP 461 and modem 440 to SIM-server 31 over CH-1.

In Step 407, the SIM-server 31 may generate & issue SRES_2. In some exemplary embodiments, upon receiving the SRES_1, SIM-server 31 may determine an SRES_2 for the virtual-SIM and transmit it back to AP 400 via CH-1, modem 440 and IP 461.

In Step 408, SRES_2 may be redirected to the RMSP. In some exemplary embodiments, upon capturing SRES_2, AP 410 pass it thru logic selector 413, SSB 471 and modem 440 to the RMSP network over CH-2.

In Step 409, the RMSP may authenticate the virtual-SIM. In some exemplary embodiments, the authentication may be determined by verifying that the SRES_2 reply comply with the SRES_1 challenge. Upon successful authentication, MT 400 may be granted access the RMSP network, wherein AP 410 may communicate with the RMSP network via IP 461 and modem 440 over CH-2.

Figure 5:
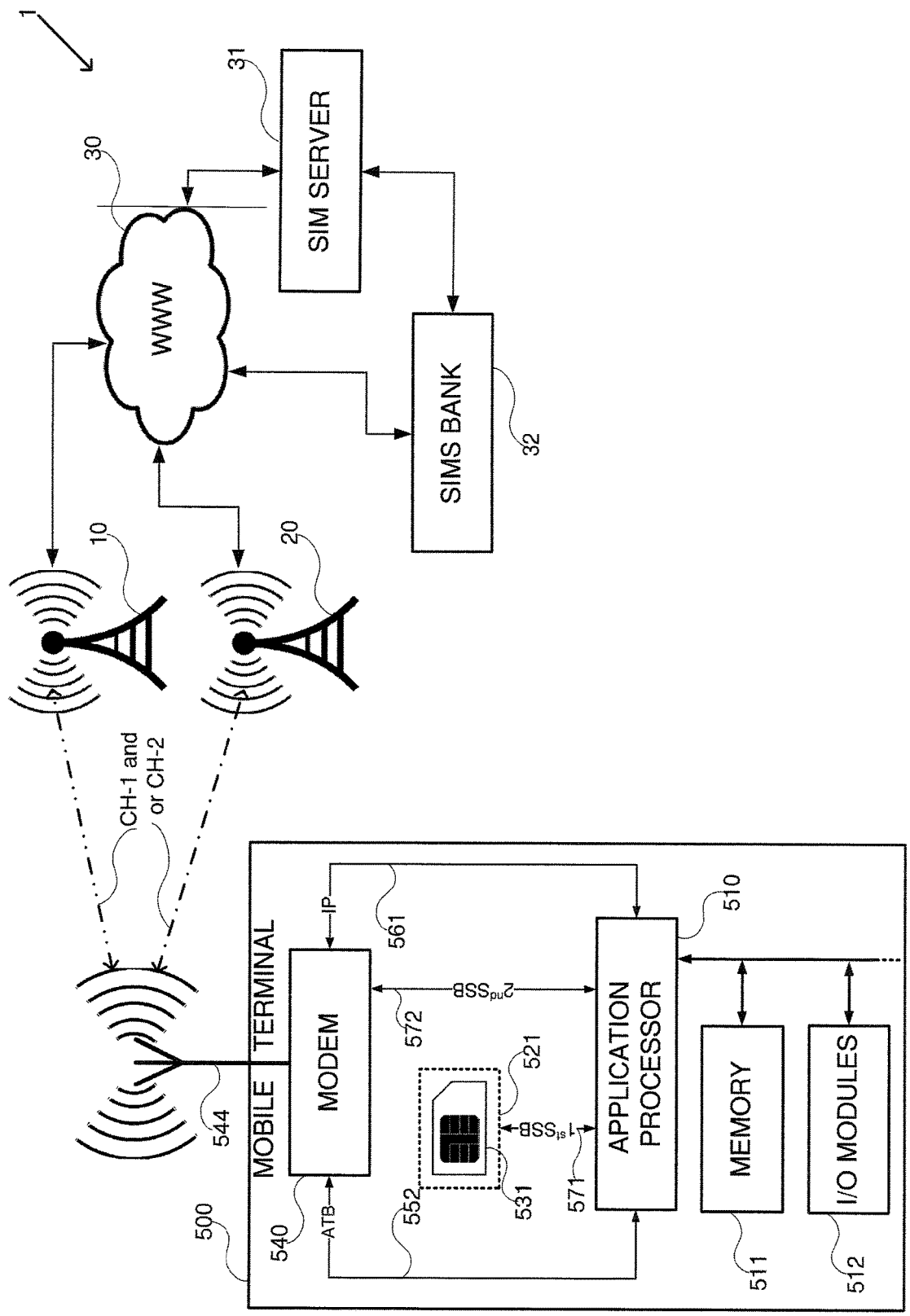
FIG. 5 shows a block diagram of an MT, in a mobile network, in accordance with some exemplary embodiments of the disclosed subject matter.

Referring now to FIG. 5, showing a mobile terminal (MT) 500, in MN 1, which supports SIM virtualization, in accordance with some exemplary embodiments of the disclosed subject matter. MT 500 may be a computerized apparatus; such as mobile phone, smartphone, mobile hotspot, tablet, smart watch, alarm systems, machine to machine (M2M), a combination thereof, or the like.

Figure 5A:
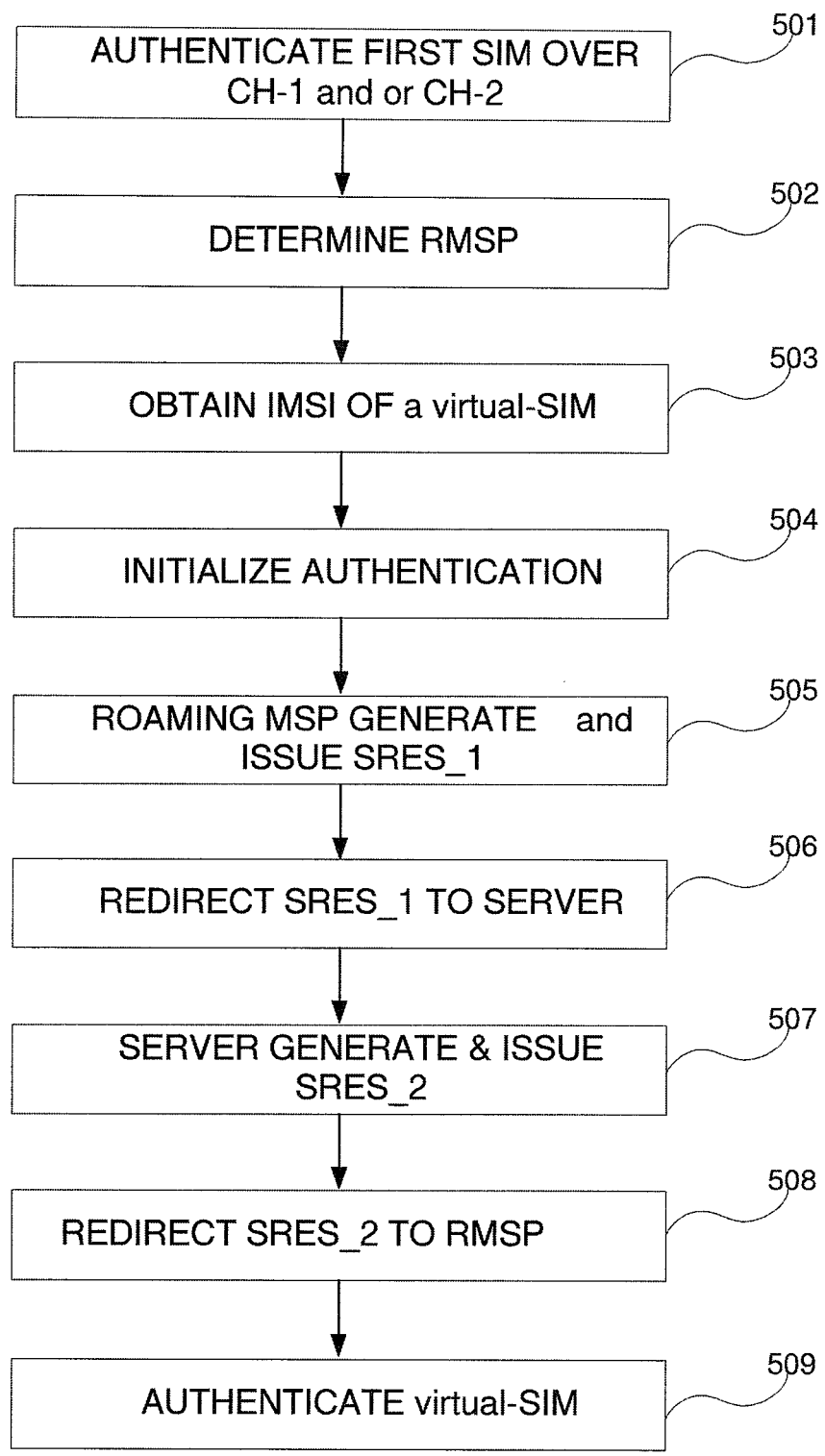
FIG. 5A shows a flowchart diagram of a process for acquiring and authenticating virtual-SIM, in accordance with some exemplary embodiments of the disclosed subject matter.

In some exemplary embodiments, the MT 500 may comprise an AP 510, such as the AP 110 depicted in FIG. 1. The AP 510 may be utilized to perform computations required by the MT 500 or any of it subcomponents to perform methods, such as depicted in FIG. 5A, for acquiring at least one virtual-SIM and authenticate the MT 500 with at least one MSP network.

In some exemplary embodiments of the disclosed subject matter, MT 500 may comprise an I/O module 512, such as the I/O module 112 depicted in FIG. 1. The I/O module 512 may be utilized to perform duties similar to the duties performed by the I/O module 112 of FIG. 1. Additionally or alternatively, the duties of the I/O module 512 may comprise interfacing between AP 510 and internal/external subsystems components, such as modems, at list one SIM card, and radio transceivers, used to perform connectivity tasks; such as Wi-Fi, cellular communication, or the like.

In some exemplary embodiments, the MT 500 may comprise a memory 511, such as the memory 111 depicted in FIG. 1. Memory 511 may retain software components that are operative to cause the processor 510 to perform methods, such as depicted in FIG. 5A, associated with the MT 500 and any of the subcomponents to perform.

In some exemplary embodiments, the MT 500 may comprise a modem 540, such as the modem 140 depicted in FIG. 1. Modem 540 may be capable to communicate (transmit & receive) information via antenna 544, over at least two channels, (e.g. CH-1 and CH-2) concurrently. In some exemplary embodiments, CH-1 and CH-2 communicate with mobile network, such as the MN 1 (previously described in FIG. 1) via the same cell, different cells, same MSP, different MSPs, a combination thereof, or the like.

In some exemplary embodiments, MT 500 may comprise slot 521, such as slots 121 of FIG. 1. The MT 500 may also comprise SIM 531, such as SIM 131, of FIG. 1. In some exemplary embodiments, SIM 531 may be inserted into slots 521. In some exemplary embodiments, MT 500 man not comprise slot 521, SIM 531 and SSB 571. In this case SIM 531 is implemented as software application running on AP 510.

In some exemplary embodiments, the MT 500 may comprise internal communication buses; such as at least one ATB 551; at least one IP 561; SSB 571, SSB 572; a combination thereof, or the like. It should be reminded that several characteristics of the internal communication buses listed herewith are described in FIG. 1.

The at least one ATB 551 may be configured to pass commands and status between AP 510 and modem 540. The at least one IP 561 may be configured to exchange information between modem 540 and AP 510. Additionally, SSB 571 may be configured to exchange information between AP 510 and SIM 531, while SSB 572 may pass information between modem 540 and AP 510.

Referring now to FIG. 5A showing a flowchart diagram of a process for acquiring and authenticating virtual-SIM, in accordance with some exemplary embodiments of the disclosed subject matter.

It should be noted that, the flowchart diagram, of FIG. 5A, described herein refers to, but not limited to, the elements depicted in FIG. 5.

In Step 501, SIM 531 may be authenticated over CH-1. In some exemplary embodiments, SIM 531 may be a native-SIM, from which the MT 500 obtain an IMSI and pass it over CH-1 to an available MSP in MN 1, in order to authenticate SIM 531 with the available MSP. Upon acquiring the IMSI, the MSP challenge SIM 531 with an SRES_1, which may be responded, by SIM 531, with SRES_2. A proper match between SRES_1 and SRES_2 enables the MSP to grant SIM 531 access to the network.

In some exemplary embodiments, the authentication of SIM 531 may be initialized by AP 510, which passes to modem 540 the IMSI of SIM 531, and transmits it over CH-1 to the available MSP in MN 1. Additionally, modem 540 facilitates communication between SIM 531 and the available MSP, whenever MT 500 communicates over CH-1.

In Step 502, a RMSP may be determined. In some exemplary embodiments, AP 510 may identify the country and the area codes in which the MT 500 is located, by either IP address query, GPS analysis, available MSPs of the previous step, a combination thereof, or the like. In some exemplary embodiments, AP 510 may determine the most appropriate RMSP for roaming, based on network code, area code, signal strength, network availability, and cost criteria's, in which the MT 200 is located.

In Step 503, IMSI of a virtual-SIM may be obtained. In some exemplary embodiments, AP 510 communicate with SIM-server 31 via IP 561, modem 540 over CH-1 and thru WWW 30, to request an IMSI of a virtual-SIM from the RMSP. Following the request the SIM-server 31 may reply to AP 510 with an IMSI of a virtual-SIM via the same path, the request arrived.

In Step 504, the virtual-SIM authentication may be initialized. In some exemplary embodiments, the IMSI of the virtual-SIM may be passed from AP 510 to modem 540 via, SSB 572. Consequently, AP 510 instructs modem 540, via ATB 551, to activate CH-2 and initialize authentication by passing the IMSI of the virtual-SIM to the RMSP network over CH-2.

In Step 505, the RMSP may generate and issue SRES_1. In some exemplary embodiments, the RMSP generate an SRES_1 challenge and transmit to AP 510 via CH-2, modem 540 and SSB 572.

In Step 506, SRES_1 may be redirected to SIM-server 31. In some exemplary embodiments, upon capturing SRES_1, AP 510 pass it thru IP 561 and modem 540 to SIM-server 31 over CH-1.

In Step 507, the SIM-server 31 may generate & issue SRES_2. In some exemplary embodiments, upon receiving the SRES_1, SIM-server 31 may determine an SRES_2 for the virtual-SIM and transmit it back to AP 500 via CH-1, modem 540 and IP 561.

In Step 508, SRES_2 may be redirected to the RMSP. In some exemplary embodiments, upon capturing SRES_2, AP 510 pass it thru SSB 572 and modem 540 to the RMSP network over CH-2.

In Step 509, the RMSP may authenticate the virtual-SIM. In some exemplary embodiments, the authentication may be determined by verifying that the SRES_2 reply comply with the SRES_1 challenge. Upon successful authentication, MT 500 may be granted access the RMSP network, wherein AP 510 may communicate with the RMSP network via IP 561 and modem 540 over CH-2.

Figure 6:
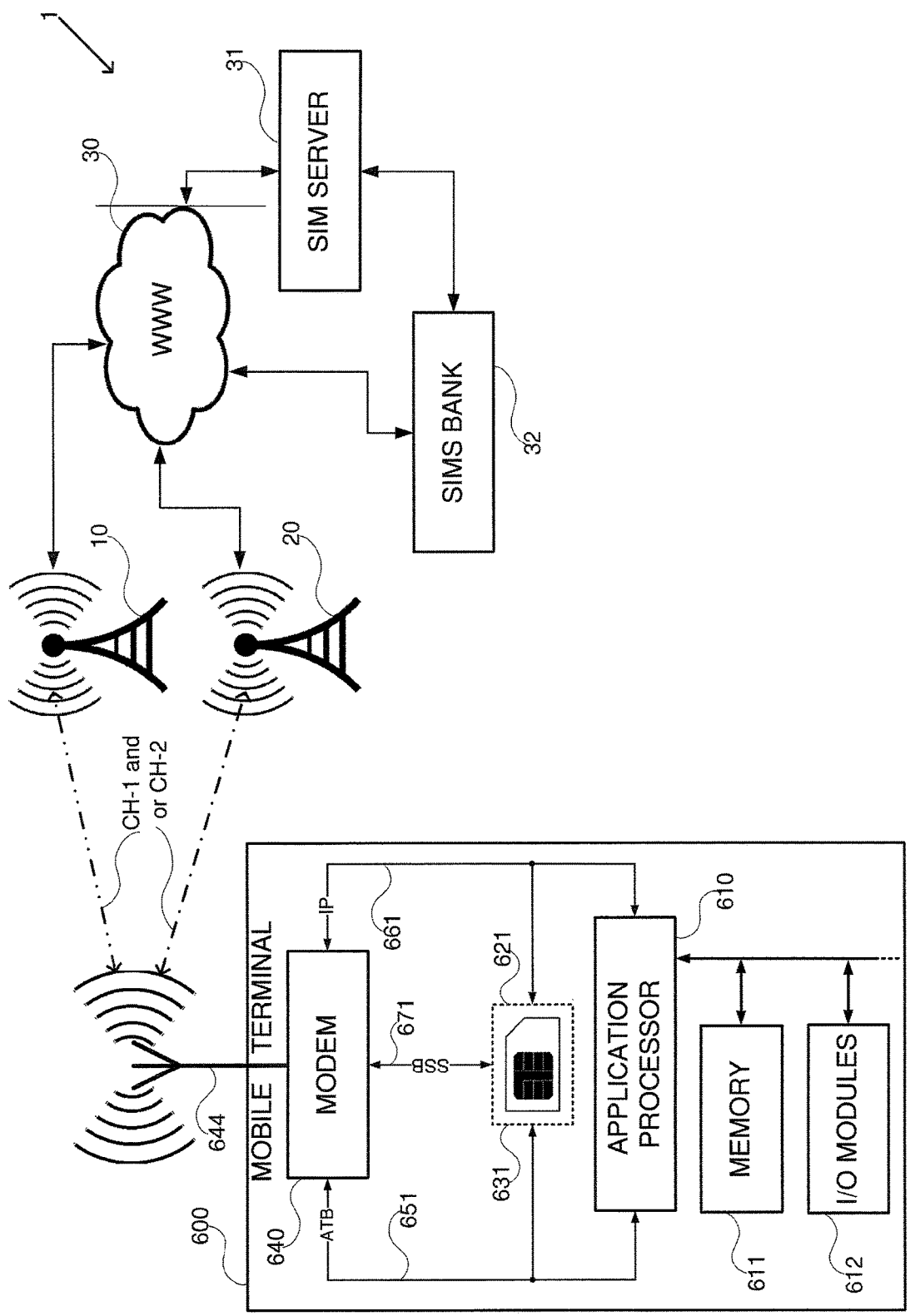
FIG. 6 shows a block diagram of an MT, in a mobile network, in accordance with some exemplary embodiments of the disclosed subject matter.

Referring now to FIG. 6, showing a mobile terminal (MT) 600, in MN 1, which supports SIM virtualization, in accordance with some exemplary embodiments of the disclosed subject matter. MT 600 may be a computerized apparatus; such as mobile phone, smartphone, mobile hotspot, tablet, smart watch, alarm systems, machine to machine (M2M), a combination thereof, or the like.

Figure 6A:
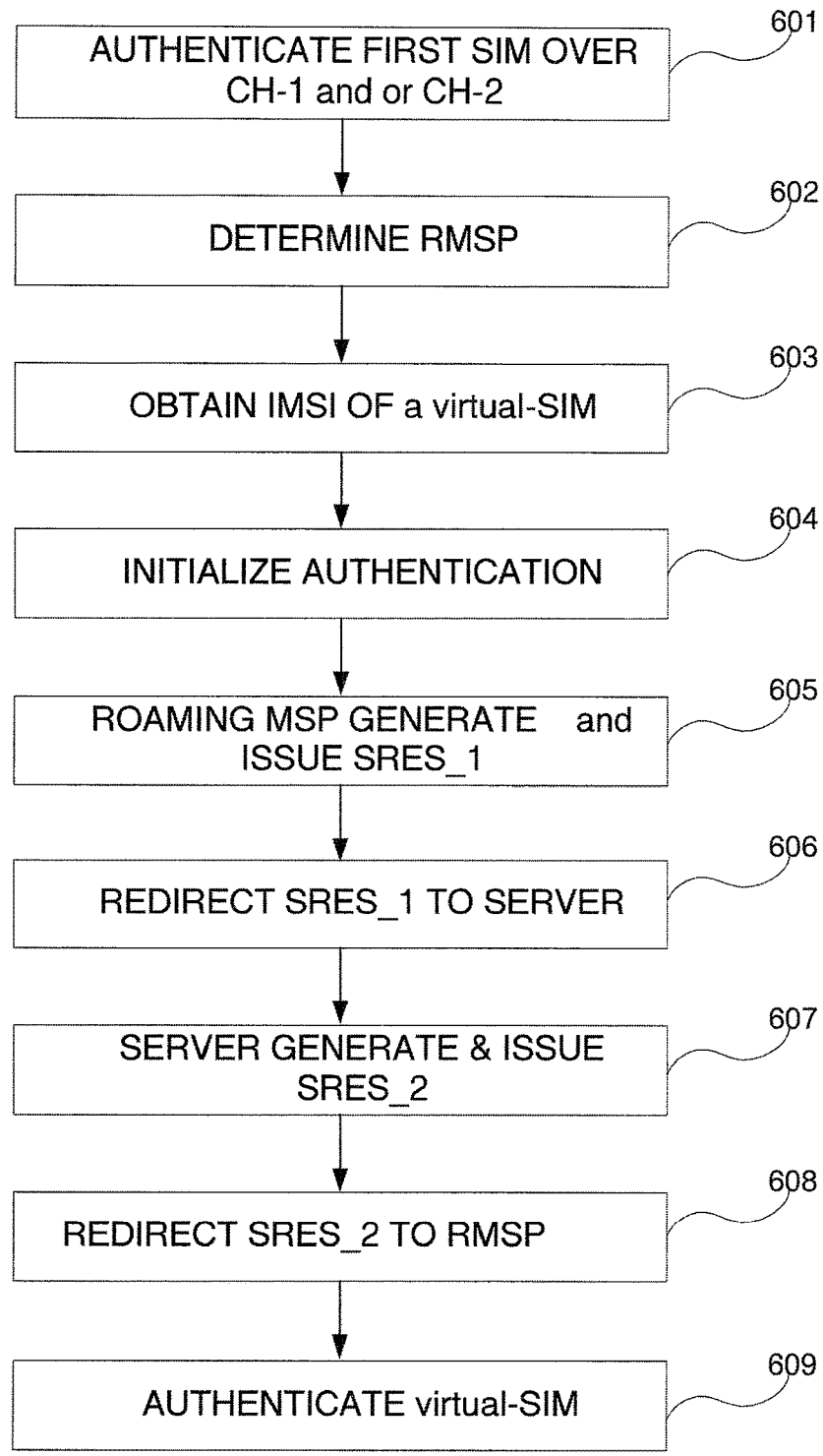
FIG. 6A shows a flowchart diagram of a process for acquiring and authenticating virtual-SIM, in accordance with some exemplary embodiments of the disclosed subject matter.

In some exemplary embodiments, the MT 600 may comprise an AP 610, such as the AP 110 depicted in FIG. 1. The AP 610 may be utilized to perform computations required by the MT 600 or any of it subcomponents to perform methods, such as depicted in FIG. 6A, for acquiring at least one virtual-SIM and authenticate the MT 600 with at least one MSP network.

In some exemplary embodiments of the disclosed subject matter, MT 600 may comprise an I/O module 612, such as the I/O module 112 depicted in FIG. 1. The I/O module 612 may be utilized to perform duties similar to the duties performed by the I/O module 112 of FIG. 1. Additionally or alternatively, the duties of the I/O module 612 may comprise interfacing between AP 610 and internal/external subsystems components, such as modems, at list one SIM card, and radio transceivers, used to perform connectivity tasks; such as Wi-Fi, cellular communication, or the like.

In some exemplary embodiments, the MT 600 may comprise a memory 611, such as the memory 111 depicted in FIG. 1. Memory 611 may retain software components that are operative to cause the processor 610 to perform methods, such as depicted in FIG. 6A, associated with the MT 600 and any of the subcomponents to perform.

In some exemplary embodiments, the MT 600 may comprise a modem 640, such as the modem 140 depicted in FIG. 1. Modem 640 may be capable to communicate (transmit & receive) information via antenna 644, over at least two channels, (e.g. CH-1 and CH-2) concurrently. In some exemplary embodiments, CH-1 and CH-2 communicate with mobile network, such as the MN 1 (previously described in FIG. 1) via the same cell, different cells, same MSP, different MSPs, a combination thereof, or the like.

In some exemplary embodiments, MT 600 may comprise slot 621, such as slots 121 of FIG. 1. The MT 600 may also comprise SIM 631, such as SIM 131, of FIG. 1. In some exemplary embodiments, SIM 631 may be inserted into slots 621.

In some exemplary embodiments, the MT 600 may comprise internal communication buses; such as at least one ATB 651, at least one IP 661, SSB 671, a combination thereof, or the like. It should be reminded that several characteristics of the internal communication buses listed herewith are described in FIG. 1.

The at least one ATB 651 may be configured to pass commands and status between AP 610 and modem 640. The at least one IP 661 may be configured to exchange information between modem 640 and AP 610. Additionally, SSB 271 may be configured to exchange information between modem 640 and SIM 631.

Referring now to FIG. 6A showing a flowchart diagram of a process for acquiring and authenticating virtual-SIM, in accordance with some exemplary embodiments of the disclosed subject matter.

It should be noted that, the flowchart diagram, of FIG. 6A, described herein refers to, but not limited to, the elements depicted in FIG. 6. It should also be noted that in the exemplary embodiment of FIG. 6A described herein, slot 631 may be populated with KICC 631 while slot 622 may be redundant or populated with a SIM that doesn't participate in the process for acquiring and authenticating virtual-SIM. In some exemplary embodiments, the properties of KICC 631 may comparable with the properties of KICC 331, of FIG. 3.

It should also be noted that the exemplary embodiments depicted in FIGS. 6 and 6A, the commercially available, modem 640 may be adapted to comply with dual SIM dual active (DSDA) communication (e.g. concurrent active communication, over CH-2 with RMSP network and over CH-1 with another MSP network). Additionally or alternatively, modem 640 may be also adapted to comply with dual SIM dual standby (DSDS), communication, e.g. actively communicate over CH-2 with RMSP network, providing that CH-1 network is on standby and vice versa.

In Step 601, KICC 631 may be authenticated over CH-1. In some exemplary embodiments, MT 600 obtain from KICC 631 its native-SIM IMSI and pass it over CH-1 to an available MSP in MN 1, in order to authenticate KICC 631 with the available MSP. Upon acquiring the IMSI, the MSP the KICC 631, of MT 600, with an SRES_1, which may be responded, by KICC 631, with SRES_2. A proper match between SRES_1 and SRES_2 enables the MSP to grant SIM 231 access to the network. In some exemplary embodiments, the authentication of KICC 631 (i.e. native-SIM subset) may be initialized by AP 610, which instructs modem 640 via ATB 651 to obtain the, KICC 631 native-SIM, IMSI, thru SSB 671, and transmit it over CH-1 to available MSP in MN 1. In addition, modem 640 facilitates communication between the KICC 631 native-SIM subset and the available MSP, whenever MT 500 communicates over CH-1.

In Step 602, a RMSP may be determined. In some exemplary embodiments, AP 610 may identify the country and the area codes in which the MT 600 is present, by either IP address query, GPS analysis, available MSPs of the previous step, a combination thereof, or the like. In some exemplary embodiments, AP 610 may determine the most appropriate RMSP for roaming, based on network code, area code, signal strength, network availability, and cost criteria's, in which the MT 600 is located.

In Step 603, an IMSI of a virtual-SIM may be obtained. In some exemplary embodiments, KICC 631 utilize its native-SIM IMSI to communicate with SIM-server 31 via IP 661, modem 640 over CH-1 and thru WWW 30, to request a virtual-SIM IMSI from the RMSP. Following the request, SIM-server 31 may reply to the KICC 631 with an IMSI of the virtual-SIM, via the same path, in which the request arrived. In some exemplary embodiments, the virtual-SIM may be stored in the KICC 631.

In Step 604, the virtual-SIM authentication may be initialized. In some exemplary embodiments, AP 610 instructs modem 640 thru ATB 651 to activate CH-2 and initialize authentication by passing the IMSI of the virtual-SIM, stored in KICC 631, to the RMSP network over CH-2. It should be noted that, KICC 631 have the capability of emulating, a native-SIM and virtual-SIM, as well as alternate between them as needed.

In Step 605, the RMSP may generate and issue SRES_1. In some exemplary embodiments, the RMSP generate an SRES_1 challenge and transmitted it, via CH-2, modem 640 and SSB 372 to the KICC 63, which may retain the SRES_1.

In Step 606, SRES_1 may be redirected to the SIM-server 31. In some exemplary embodiments, upon capturing SRES_1, AP 610 may toggle, via ATB 651, the KICC 631 to native-SIM and instructs it to pass the SRES_1 thru modem 640 to SIM-server 31 over CH-1.

In Step 607, the SIM-server 31 may generate & issue SRES_2. In some exemplary embodiments, upon receiving the SRES_1, SIM-server 31 may determine an SRES_2 for the virtual-SIM and transmit it back to KICC 631 via CH-1, modem 640 and IP 661.

In Step 608, SRES_2 may be redirected to the RMSP. In some exemplary embodiments, upon capturing SRES_2, KICC 332 may be toggled back to its virtual-SIM identity and pass the SRES_2, via modem 640, to the RMSP network over CH-2.

In Step 609, the RMSP may authenticate the virtual-SIM. In some exemplary embodiments, the authentication may be determined by verifying that the SRES_2 reply comply with the SRES_1 challenge. Upon successful authentication, MT 600 may be granted access the RMSP network, wherein KICC 631 may communicate with the RMSP network via IP 661 and modem 640 over CH-2.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A mobile terminal comprising:
a single cellular modem having concurrent protocol stack, wherein the modem is capable of simultaneous communicating over two channels with at least one mobile network;
a logic selector configured to pass authentication information of a SIM to the modem, wherein the SIM is selected from a group comprising of a physical SIM accommodated in a first slot (native SIM); a virtual SIM; and a combination thereof;
firmware retained in a non-transitory memory operative to cause the mobile terminal to obtain and authenticate the virtual SIM for communicating with the at least one mobile network;
wherein the virtual SIM is obtained from a SIM server connected to a SIM bank that comprises a plurality of SIM profiles;
wherein the logic selector is provided by implementation selected from a group comprising of firmware; hardware; and a combination thereof; and
wherein the mobile terminal, further comprises a second slot adapted to accommodate a keepgo integrated circuit card (KICC), and wherein the KICC is configured to facilitate said obtain and authenticate a virtual SIM.

2. The mobile terminal of claim 1, further comprises a processor, wherein the logic selector, the modem, the processor, and the memory are part of a system on chip.

3. The mobile terminal of claim 1, wherein the mobile terminal communicates over at least two channels with a single modem and a single SIM, wherein the single SIM is a native SIM inserted in the first slot.

4. A mobile terminal comprising:
a single cellular modem having concurrent protocol stack, wherein the modem is capable of simultaneous communicating over two channels with at least one mobile network;
   a logic selector configured to pass authentication information of a SIM to the modem, wherein the SIM is selected from a group comprising of a physical SIM accommodated in a first slot (native SIM); a virtual SIM; and a combination thereof;
   firmware retained in a non-transitory memory operative to cause the mobile terminal to obtain and authenticate the virtual SIM for communicating with the at least one mobile network;
   wherein the virtual SIM is obtained from a SIM server connected to a SIM bank that comprises a plurality of SIM profiles;
   wherein the logic selector is provided by implementation selected from a group comprising of firmware; hardware; and a combination thereof, wherein the native SIM comprises SIM card profile; and wherein the native SIM is a KICC.

5. The mobile terminal of claim 4, further comprises a processor, wherein the logic selector, the modem, the processor, and the memory are part of a system on chip.

6. The mobile terminal of claim 4, wherein the mobile terminal communicates over at least two channels with a single modem and a single SIM, wherein the single SIM is a native SIM inserted in the first slot.

7. A method for acquiring and authenticating a virtual-SIM for a mobile terminal, having a single modem capable of concurrently communicating over a first channel and a second channel and a single native SIM, the method comprising:
   authenticating the native SIM of the mobile terminal by enabling communication over the first channel between the native SIM via a logic selector of the mobile terminal with a mobile service provider (MSP);
   determining a roaming MSP (RMSP)
   requesting and obtaining over the first channel an international mobile subscriber identity (IMSI) of a virtual-SIM for the mobile terminal from a SIM-server configured to obtain virtual SIM information from a SIMS Bank;
   initializing authentication of the virtual-SIM with the RMSP by passing the IMSI of the virtual-SIM via the logic selector over the second channel to the RMSP;
   generating and issuing over the second channel a first certificate challenge (SRES_1) by the RMSP to the mobile terminal;
   redirecting the SRES_1 from the mobile terminal over the first channel to the SIM-server;
   generating a response (SRES_2) by the SIM-server and issuing the SRES_2 to the mobile terminal over the first channel;
   redirecting the SRES_2 via the logic selector of the mobile terminal to the RMSP over the second channel; and
   authenticating the virtual-SIM by verifying that the SRES_2 comply with the SRES_1 and enabling mobile terminal communication over the second channel through the RMSP.

8. The method of claim 7, wherein the mobile terminal further comprises a firmware configured to control communication activities of the mobile terminal, and wherein operations associated to the logic selector is done by a firmware.

9. The method of claim 7, wherein said authenticating the native SIM further comprises: passing the IMSI of the native-SIM of the mobile terminal to the MSP; issuing the SRES_1 by MSP to the mobile terminal; replying to the MSP with the SRES_2 of the mobile terminal; and verifying that the SRES_2 comply with the SRES_1 and enabling mobile terminal communication over the first channel through the MSP.

10. The method of claim 7, wherein said determining RMSP comprises:
   identifying country and an area code in which the mobile terminal operates by at least process selected from a group comprising of: IP address query; GPS analysis, MSP availability; and a combination thereof; and
   selecting the RMSP according to criteria selected from a group comprising of: network code; area code; signal strength; network availability; cost; and a combination thereof.

11. The method of claim 10, wherein the KICC is configured for alternating between the native SIM and the virtual-SIM when communicating over the first channel and the second channel, respectively.

12. The method of claim 7, wherein the SIM-server is accessed through the Internet via the first channel.

13. The method of claim 7, wherein said authenticating the native SIM of the mobile terminal is authenticating a KICC, and wherein the KICC is configured to emulate the native SIM.

14. The method of claim 13, wherein the KICC is further configured to facilitate virtual-SIM authentication of the mobile terminal.

15. The method of claim 13, wherein the KICC is further configured to perform operations associated with the logic selector.

16. The method of claim 13, wherein the KICC is further configured to retain the IMSI of the virtual-SIM.

17. The method of claim 13, wherein the KICC is capable of emulating the virtual-SIM.

* * * * *